United States Patent
Rejman et al.

(10) Patent No.: US 12,540,148 B2
(45) Date of Patent: Feb. 3, 2026

(54) LIPOPHOSPHONOXINS, THEIR PREPARATION AND USE

(71) Applicants: USTAV ORGANICKE CHEMIE A BIOCHEMIE AV CR, V. V. I., Prague (CZ); MIKROBIOLOGICKY USTAV AV CR, V. V. I., Prague (CZ); UNIVERZITA PALACKEHO V OLOMOUCI, Olomouc (CZ)

(72) Inventors: Dominik Rejman, Prague (CZ); Radek Pohl, Uholicky (CZ); Viktor Mojr, Blovice (CZ); Duy Dinh Do Pham, Prague (CZ); Milan Kolar, Olomouc (CZ); Libor Krasny, Roztoky (CZ)

(73) Assignees: USTAV ORGANICKE CHEMIE A BIOCHEMIE AV CR, V.V.I., Prague (CZ); MIKROBIOLOGICKY USTAV AV CR, V.V.I., Prague (CZ); UNIVERZITA PALACKEHO V OLOMOUCI, Olomouc (CZ)

( * ) Notice: Subject to any disclaimer, the term of this patent is extended or adjusted under 35 U.S.C. 154(b) by 926 days.

(21) Appl. No.: 17/779,491

(22) PCT Filed: Dec. 9, 2020

(86) PCT No.: PCT/CZ2020/050095
§ 371 (c)(1),
(2) Date: May 24, 2022

(87) PCT Pub. No.: WO2021/115503
PCT Pub. Date: Jun. 17, 2021

(65) Prior Publication Data
US 2023/0028523 A1    Jan. 26, 2023

(30) Foreign Application Priority Data
Dec. 12, 2019   (CZ) .................. CZ2019-769

(51) Int. Cl.
*C07F 9/40*        (2006.01)

(52) U.S. Cl.
CPC .................. *C07F 9/4009* (2013.01)

(58) Field of Classification Search
None
See application file for complete search history.

(56) References Cited

U.S. PATENT DOCUMENTS

2002/0032164 A1    3/2002   Dale et al.

FOREIGN PATENT DOCUMENTS

| | | |
|---|---|---|
| AU | 2017257061 A1 | 11/2018 |
| CA | 3021537 A1 | 11/2017 |
| CZ | 303569 B6 | 12/2012 |
| CZ | 308344 B6 | 6/2020 |
| EP | 2527351 A1 | 11/2012 |
| EP | 3448865 A1 | 3/2019 |
| WO | 2016082835 A1 | 6/2016 |

OTHER PUBLICATIONS

International Search Report and Written Opinion for corresponding PCT application No. PCT/CZ2020/050095, mailed Feb. 10, 2021.

*Primary Examiner* — Po-Chih Chen
(74) *Attorney, Agent, or Firm* — Notaro, Michalos & Zaccaria P.C.

(57) ABSTRACT

Lipophosphonoxins of general formula I, diastereomers and mixtures of diastereomers of compounds of general formula I and their pharmaceutically acceptable salts and hydrates as antibacterial agents, forming an active ingredient in pharmaceutical compositions for the treatment of resistant bacterial infections, disinfectants and/or selective culture media is disclosed.

7 Claims, No Drawings

LIPOPHOSPHONOXINS, THEIR PREPARATION AND USE

FIELD OF ART

The invention relates to novel substances with antibacterial effects and their use in vitro and in vivo.

BACKGROUND ART

The number of bacteria that are becoming resistant to conventional antibacterial drugs is growing, and therefore new drugs are needed to treat diseases caused by these resistant bacteria (Davies D., Davies J., Microbiol. Mol. Biol. Rev. 2010, 74(3), 417; Kesselheim A. S., Outterson K., Health Aff 2010, 29, 1689).

First-generation lipophosphonoxins with activity against gram-positive bacteria have been recently described (J. Med. Chem. 2011, 54(22), 7884-7898, CZ patent 303569, patent EP 2527351). Furthermore, the mechanism of their action, consisting of the selective disruption of the bacterial membrane, has also been described (PLoS One 2015, 10(12), e0145918). This was followed by second-generation lipophosphonoxins (J. Med. Chem. 2017, 60(14):6098-6118, CZ 308344, EP 3448865, AU 2017257061, CA3021537).

Lipophosphonoxins (LPPOs) are bactericidal substances with rapid kinetics, and they are not genotoxic. The maximum tolerated dose (MTD) in mice when administered orally is very high (>2000 mg/kg) and the bacteria are unable to develop resistance. Lipophosphonoxins are chemically stable over a wide pH range and do not pass through the monolayer of CACO-2 cells, which means that they are unlikely to be absorbed when administered orally.

LPPOs belong to a growing family of antibacterial peptidomimetics, such as cationic steroid antibiotics (Fems Microbiol Lett. 2002, 217(1):1-7; Bba-Biomembranes 2007, 1768(10), 2500-2509; J. Med. Chem. 2002 45(3), 663-669), lipophilic derivatives of norspermidine (J. Med. Chem. 2014, 57(22), 9409-9423), arylamide foldamers (Antimicrob Agents Ch. 2011, 55(11), 5043-5053; Angew. Chem. Int. Edit. 2004, 43(9), 1158-1162) or the promising synthetic bactericidal antimicrobial peptide LTX-109 (Angew Chem Int Edit 43:1158-62. Antimicrob Agents Ch 55:5043-53), which degrades the membranes of harmful microorganisms. Although these compounds are structurally heterogeneous, they are all amphiphilic molecules containing a lipophilic moiety and a hydrophilic moiety, usually carrying a positive charge. Lipophosphonoxins also share this structural motif, however, the main advantage of lipophosphonoxins lies in their modular structure, enabling the systematic tuning of their biological properties.

DISCLOSURE OF THE INVENTION

This invention describes novel lipophosphonoxins of the general formula I which have strong antibacterial effects against gram-positive and gram-negative bacteria. The advantage of these compounds is, in addition to easy preparation, also the large degree of modularity of their structure, which enables additional adaptation of their biological properties.

The invention therefore relates to lipophosphonoxins of the general formula

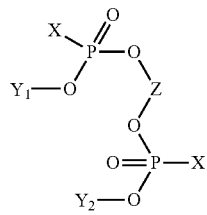

wherein the X substituent is independently selected from the following structures:

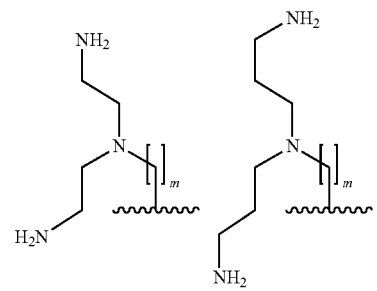

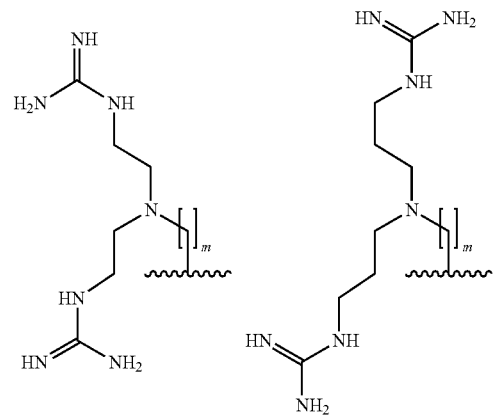

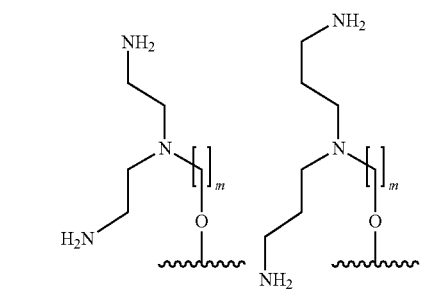

-continued

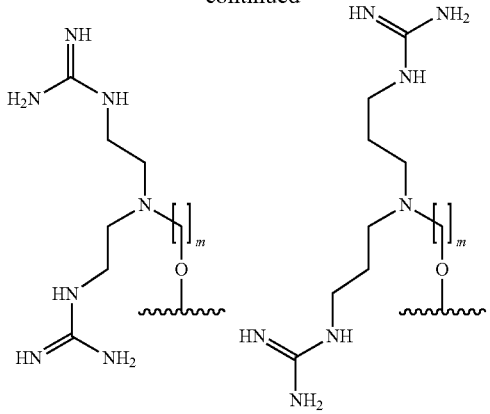

wherein m=1-3;
the Y substituent is independently selected from the following structures:

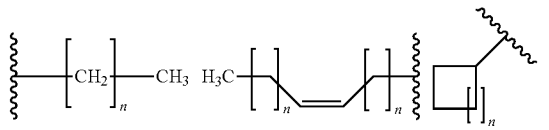

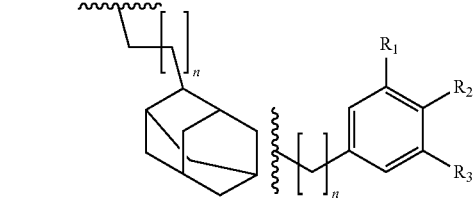

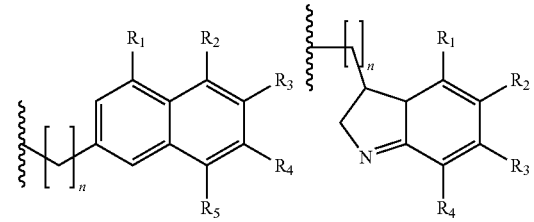

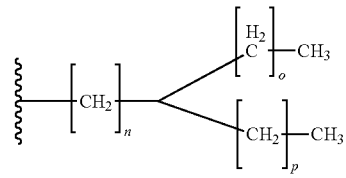

wherein n=0-12, and o=0-12, and p=0-12, and
wherein $R_1$, $R_2$, $R_3$, $R_4$, and $R_5$ are independently selected from the group consisting of: H—, $CH_3$—, $CH_2CH_3$, propyl, isopropyl, isobutyl, tert-butyl, $CH_3O$—, $CH_2CH_3O$—, propoxy, isopropoxy, isobutyloxy or tert-butyloxy;
and
the Z substituent is independently selected from the following structures:

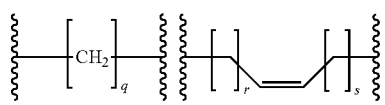

-continued

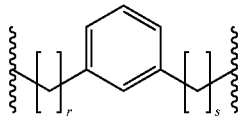

wherein q=2-14, and r=0-10, and s=0-10;
and diastereomers and mixtures of diastereomers of the compounds of formula I and their pharmaceutically acceptable salts and hydrates.
Preferably, the Y substituent is selected from:

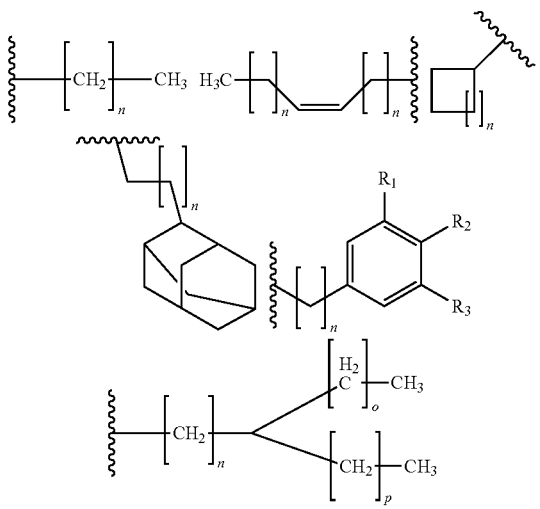

wherein n, o, p, $R_1$, $R_2$, $R_3$ are as described herein.
Preferably, $R_1$, $R_2$, $R_3$ are H or methyl.
Preferably, the X substituent is selected from:

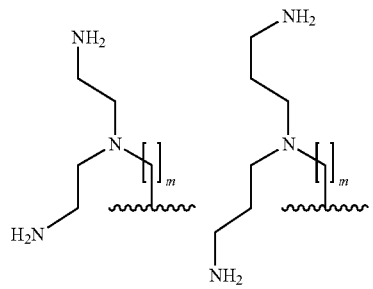

wherein m is 1-3.
Preferably, Z is

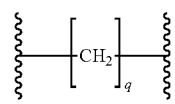

wherein q is 4 to 14.
Said salts include salts with inorganic or organic anions and in particular, but not exclusively, pharmaceutically acceptable salts suitable for physiological administration.
Pharmaceutically acceptable salts may be salts derived from inorganic or organic acids. A person skilled in the art will be able to determine which salts are pharmaceutically acceptable; in particular, they are salts with one or more desirable physical properties such as increased pharmaceutical stability at various temperatures and humidities, the desired solubility in water or oil, or are non-toxic.

Suitable pharmaceutically acceptable salts of the compounds of this invention preferably include anions derived from inorganic acids such as hydrochloric, hydrobromic, hydrofluoric, boric, fluoroboric, phosphoric, metaphosphoric, nitric, carbonic, sulfuric and sulfurous acids and from organic acids such as acetic acid, benzenesulfonic, benzoic, citric, ethanesulfonic, fumaric, gluconic, glycolic, isethionic, lactic, lactobionic, maleic, malonic, methanesulfonic, trifluoromethanesulfonic, succinic, toluenesulfonic, tartaric and trifluoroacetic acids. Suitable organic acids generally include, for example, the following classes of organic acids: aliphatic, cycloaliphatic, aromatic, arylaliphatic, heterocyclic, carboxylic and sulfonic acids.

Specific examples of suitable organic acids include acetate, trifluoroacetate, formate, propionate, succinate, glycolate, gluconate, digluconate, hyaluronate, lactate, malate, tartrate, citrate, ascorbate, glucuronate, maleate, fumarate, pyruvate, aspartate, glutamate, benzoate, anthranilate, stearate, salicylate, p-hydroxybenzoate, phenylacetate, mandelate, pamoate, methanesulfonate, ethanesulfonate, benzenesulfonate, pantothenate, toluenesulfonate, 2-hydroxyethanesulfonate, sulfanilate, cyclohexylaminosulfonate, 13-hydroxybutyrate, galactarate, galacturonate, adipate, alginate, butyrate, camphorate, camphorsulfonate, cyclopentanepropionate, dodecyl sulfate, glycoheptanoate, glycerophosphate, heptanoate, hexanoate, nicotinate, 2-naphthalenesulfonate, oxalate, palmoate, pectinate, 3-phenylpropionate, picrate, pivalate, thiocyanate and undecanoate.

The compounds of formula I contain several chiral centers (especially in the L groups and in some $R_2$ groups). The existence of a chiral center allows the compound to exist as one of two possible optical isomers ((R)- or (S)-enantiomer), or as a racemic mixture of both. In this case, where other chiral centers are present, all diastereomers and mixtures of diastereomers formed are also included in the range of the lipophosphonoxins of general formula I described in this invention.

The invention furthermore relates to lipophosphonoxins of the general formula I or their diastereomers or to pharmaceutically acceptable salts and hydrates, and/or mixtures of such compounds, for use as medicaments.

The invention furthermore relates to lipophosphonoxins of the general formula I or their diastereomers or to pharmaceutically acceptable salts and hydrates, and/or mixtures of such compounds, for use as antibacterial drugs.

The invention also relates to a pharmaceutical composition, preferably to an antibacterial drug composition, comprising at least one lipophosphonoxin of the general formula I or diastereomer or a pharmaceutically acceptable salt or hydrate thereof, and/or a mixture of such compounds as the active ingredient.

The invention furthermore relates to a disinfectant for non-therapeutic purposes and/or to a selective culture medium comprising at least one lipophosphonoxin of general formula I or a diastereomer or a pharmaceutically acceptable salt or hydrate thereof, and/or mixtures of such compounds as the active ingredient.

The invention also relates to the use of lipophosphonoxins of general formula I or their diastereomers or pharmaceutically acceptable salts or hydrates, and/or mixtures of such compounds, for the preparation of an antibacterial drug.

The invention further relates to a method of treatment of bacterial infections, said method comprising the step of administering at least one lipophosphonoxin of the general formula I or diastereomer or a pharmaceutically acceptable salt or hydrate thereof to a subject in need of such treatment.

Finally, the invention relates to the use of lipophosphonoxins of general formula I or their diastereomers or pharmaceutically acceptable salts and hydrates, and/or mixtures of such compounds, as active ingredients of disinfectants for non-therapeutic purposes, and/or selective culture media for in vitro cultivation of bacteria, fungi or eukaryotic cell lines.

A medicament/drug is any substance or combination of substances intended to treat or prevent disease in humans or animals, and any substance or combination of substances which may be administered to humans or animals to establish a medical diagnosis or to restore, ameliorate or modify physiological functions of humans or animals.

The compounds of this invention exhibit antibacterial effects against strains of *Escherichia coli, Pseudomonas aeruginosa, Enterococcus faecalis, Staphylococcus aureus, Staphylococcus haemolyticus, Enterococcus faecium, Staphylococcus epidermidis, Enterobacter kobei*, and even against strains resistant to existing antibiotics.

Compared to the first-generation LPPOs (*J. Med. Chem.* 2011, 54(22), 7884-7898, patent CZ 303569, patent EP2527351) and the second-generation LPPOs (*J. Med. Chem.* 2017, 60(14):6098-6118, CZ 308344, EP 3448865, AU 2017257061), the herein presented third-generation lipophosphonoxins (LPPOs) exhibit a wider spectrum of antibacterial activity, higher selectivity and easier preparation. The biggest benefit over the prior art is the fact that they exhibit significantly lower hemolytic activities as well as very low binding to serum albumins

TABLE 1

Comparison of the properties of the second (1) and third (2,3) generation of lipophosphonoxins-influencing antibacterial activity in the presence of serum albumins

| | | MIC (mg/l) | | |
| --- | --- | --- | --- | --- |
| | 0% BSA | | 4% BSA | |
| Compound | Escherichia coli ATCC 25922 | Staphylococcus aureus ATCC 29213 | Escherichia coli ATCC 25922 | Staphylococcus aureus ATCC 29213 |
| 1 LPPO II DR7030 | 2 | 2 | >200 | >200 |
| 2 LPPO III Example 37 of this invention | 2 | 1 | 4 | 1 |
| 3 LPPO III Example 49 of this invention | 4 | 1 | 8 | 2 |

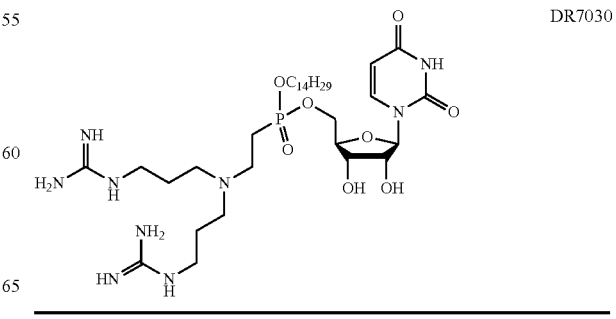

DR7030

The greatest benefit of the claimed compounds is their surprisingly high potency, even against dangerous multi-resistant bacterial strains occurring in a hospital environment. In addition, the structure of the third-generation LPPOs is even more modular than the first- and second-generation LPPOs, allowing the fine tuning of physical and biological properties.

The higher degree of modularity of the structure of third-generation LPPOs compared to first- and second-generation LPPOs, enabled by their easy synthesis and assembly of individual modules, provides extensive structural variations of the compounds of this invention that can be used to modulate their biological activity.

EXAMPLES

Formula (I) includes the compounds listed in Examples 34-37 and 39-58.
List of Abbreviations
DCM dichlormethan
TPSCl triisopropyl benzenesulfonyl chloride
IR infrared spectrum
HR-ESI high resolution mass spectrum using electron spray ionization
HR-EI high resolution mass spectrum using electron impact ionization
n-BuOH n-butyl alcohol
DMTr dimethoxy trityl
THF tetrahydrofuran
$EC_{50}$ mean effective concentration (causing 50% of maximum effect)
$IC_{50}$ inhibitory concentration (causing 50% of the maximum inhibitory effect)
rpm rotations per minute
rt room temperature General Methods General Method A—Removal of Phosphonate Methyl Ester Group Methyl phosphonate (1 mmol) is dissolved in 60% aqueous pyridine (20 mL) and the reaction mixture is stirred at 60° C. for 24 h. The reaction mixture is concentrated in vacuo at temperature below 40° C., the residue is dissolved in ethanol (20 mL) and passed through a column of Dowex 50 v H$^+$ form (5 g). The column is washed with EtOH (40 ml). The solvent is removed in vacuo. Product is obtained by column chromatography on silica gel using linear gradient of solvent system H1 (ethyl acetate, acetone, ethanol, water 4:1:1:1) in ethyl acetate.

General Method B1—Esterification of Monomethyl Vinylphosphonate Using Oxalylchloride Mono alkyl vinylphosphonate (1 mmol) is rendered dry by co-evaporation with EtOH (10 ml/mmol) and toluene (10 ml), dissolved in DCM (3 ml) and cooled to −78° C. under argon atmosphere. Oxalylchloride (2 mol/L) in DCM (0.3 ml) is slowly added and the reaction mixture is stirred at rt for 30 min. Catalytic amount of DMF (50 μL) is added and the reaction mixture is stirred until gas evolution ceased. Hydroxyderivative (1 mmol) is then added followed by addition of triethylamine (1.1 mmol). The reaction mixture is stirred at rt for 12 h under argon atmosphere. The reaction mixture is extracted with sat. soln. NaHCO$_3$ (10 mL) and sat. soln. NaCl (10 mL). Organic phase is dried over Na$_2$SO$_4$ and concentrated in vacuo. Product is obtained by column chromatography using linear gradient of acetone in toluene or linear gradient of ethanol in chloroform.

General Method B2—Esterification of Monomethyl Vinylphosphonate Using TPSCl

Mono alkyl vinylphosphonate (1 mmol) and hydroxyderivative (2 mmol) is rendered anhydrous by co-evaporation with DCM (2×10 ml) and dissolved in the same solvent (5 mL). Methylimidazole (3 mmol) and TPSCl (2 mmol) were added and the reaction mixture is stirred at re under argon atmosphere for 24-48 h. Progress of the reaction is followed by TLC using mixture of acetone/toluene (1:1). The reaction mixture is diluted with DCM (10 mL) and washed subsequently with sat. soln NaHCO$_3$ (10 ml) and brine (10 mL). Organic phases were combined, dried over Na$_2$SO$_4$ and concentrated in vacuo. Product is obtained by column chromatography using linear gradient of acetone in toluene or linear gradient of ethanol in chloroform.

General Method C—Reaction of Monoalkyl Vinylphosphonate with α,ω-dibromoalkane

Mono alkyl vinylphosphonate (1 mmol) and tetrabutylammonium hydroxide (1 mmol) is rendered anhydrous by co-evaporation with ethanol (2× 10 mL) and DMF (10 mL) and dissolved in DMF (5 mL). α,ω-Dibromalkan (0.36 mmol) is added and the reaction mixture is stirred under argon atmosphere at 90° C. for 24-48 h. Progress of the reaction is followed by TLC using mixture of acetone/toluene (1:1). The reaction mixture is concentrated in vacuo and product is obtained by column chromatography using linear gradient of acetone in toluene.

General Method D—Michael Addition

The mixture of vinylphosphonate dimer (1 mmol) and secondary amine (3 mmol) in n-butanol (50 mL/mmol) is stirred at 105° C. for 24-72 h in sealed flask. Progress of the reaction is followed by TLC using mixture of EtOH/CHCl$_3$ (1:10). The reaction mixture is concentrated in vacuo and product is obtained by column chromatography using linear gradient of ethanol in chloroform.

General Method E—Removal of Boc Protecting Groups

Starting Boc derivative (1 mmol) is dissolved in 0.5M methanolic HCl (10 mL). The reaction mixture is stirred at rt for 24 h. The reaction mixture is concentrated in vacuo and product is obtained by precipitation from anhydrous ethyl acetate. If necessary, the final product is repurified by preparative HPLC on reversed phase using linear gradient of methanil in 0.1% aqueous TFA.

Example 1: Butyl Vinylphosphonate

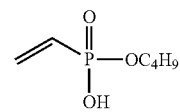

Butyl vinylphosphonate is prepared from mono methyl vinylphosphonate (7.0 g, 57.3 mmol) and 1-butanol using general method B2 and general method A in 47% (4.39 g, 26.7 mmol) overall yield in the form of colorless oil.

$^1$H NMR (400.1 MHz, CDCl$_3$): 0.90-0.95 (m, 3H), 1.35-1.45 (m, 2H,), 1.62-1.69 (m, 2H), 3.98-4.04 (m, 2H), 5.99-6.34 (m, 3H), 9.78 (s, 1H).

$^{13}$C NMR (100.6 MHz, CDCl$_3$): 13.57, 18.70, 32.35 (d, $J_{C,P}$=7.0), 65.46 (d, $J_{C,P}$=6.0), 126.19 (d, $J_{C,P}$=189.1), 134.61 (d, $J_{C,P}$=2.0).

$^1$P{H} NMR (162.0 MHz, CDCl$_3$): 21.72.

IR $v_{max}$ (KBr) 3090 (vw), 2963 9s), 2935 (s), 2876 (m), 2847 (m), 2739 (w, vbr), 2671 (w, vbr), 2337 (m, vbr), 2177 (w, vbr), 1666 (m, vbr), 1615 (m), 1476 (w), 1466 (m), 1459 (w), 1403 (m), 1276 (w), 1199 (s), 1062 (s), 1031 (vs), 986 (vs), 899 (w).

HR-MS (ESI$^+$) For C$_6$H$_{13}$O$_3$NaP (M+Na)$^+$ calcd 187.04945, found 187.04951.

Example 2: Pentyl Vinylphosphonate

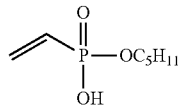

Pentyl vinylphosphonate is prepared from mono methyl vinylphosphonate (6.50 g, 53.3 mmol) and 1-pentanol using general method B2 and general method A in 47% (4.43 g g, 24.9 mmol) overall yield in the form of colorless oil.

$^1$H NMR (400.1 MHz, CDCl$_3$): 0.87-0.93 (m, 3H), 1.28-1.39 (m, 4H), 1.64-1.71 (m, 2H), 3.72 (d, 3H, $J_{H,P}$=8.0), 3.98-4.05 (m, 2H), 5.97-6.36 (m, 3H).

$^{13}$C NMR (100.6 MHz, CDCl$_3$): 13.93, 22.21, 27.62, 30.14 (d, $J_{C,P}$=7.0), 52.31 (d, $J_{C,P}$=5.0), 66.08 (d, $J_{C,P}$=6.0), 125.21 (d, $J_{C,P}$=184.1), 135.91 (d, $J_{C,P}$=2.0).

$^{31}$P{$^1$H} NMR (162.0 MHz, CDCl$_3$): 21.11.

IR $v_{max}$ (KBr) 3090 (vw), 2959 (s), 2934 (s), 2874 (m), 2861 (m), 1613 (w), 1467 (w), 1461 (w), 1435 (vw), 1400 (m), 1381 (w), 1280 (w), 1242 (s), 1185 (w), 1057 (vs), 1042 (vs), 1022 (vs), 1004 (s), 989 (s), 856 (w), 814 (m).

HR-MS (ESI$^+$) For C$_8$H$_{18}$O$_3$P (M+H)$^+$ calcd 193.09881, found 193.09872.

Example 3: Hexyl Vinylphosphonate

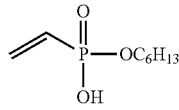

Hexyl vinylphosphonate is prepared from mono methyl vinylphosphonate (5.70 g, 46.7 mmol) and 1-hexanol using general method B2 and general method A in 42% (3.77 g g, 19.6 mmol) overall yield in the form of colorless oil.

$^1$H NMR (400.1 MHz, CDCl$_3$): 0.86-0.90 (m, 3H), 1.23-1.40 (m, 6H), 1.63-1.70 (m, 2H), 3.97-4.02 (m, 2H), 5.99-6.34 (m, 3H), 10.53 (s, 1H). $^{13}$C NMR (100.6 MHz, CDCl$_3$): 13.98, 22.52, 25.15, 31.33, 30.31 (d, $J_{C,P}$=6.0), 65.79 (d, $J_{C,P}$=6.0), 126.2 (d, $J_{C,P}$=189.1), 134.61 (d, $J_{C,P}$=2.0).

$^{31}$P{$^1$H} NMR (162.0 MHz, CDCl$_3$): 21.48.

IR $v_{max}$ (KBr) 3089 (vw), 2959 (s), 2932 (s), 2873 (s), 2861 (s), 2732 (m, vbr), 2672 (m, vbr), 2337 (m,vbr), 2181 (m, vbr), 1672 (m, vbr), 1615 (w), 1468 (m), 1462 (m), 1458 (m), 1276 (m), 1199 (s), 1059 (s), 1042 (vs), 1020 (vs), 986 (vs), 895 (w).

HR-MS (ESI$^+$) For C$_8$H$_{17}$O$_3$NaP (M+Na)$^+$ calcd 215.08075, found 215.08069.

Example 4: Heptyl Vinylphosphonate

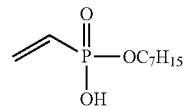

Heptyl vinylphosphonate is prepared from mono methyl vinylphosphonate (9.65 g, 79.1 mmol) and 1-heptanol (11.2 mL, 79.1 mmol) using general method B1 and general method A in 70% (11.5 g, 55.5 mmol) overall yield in the form of colorless oil.

$^1$H NMR (401 MHz, Chloroform-d) δ 10.83 (s, 1H), 6.34-5.98 (m, 3H), 3.99 (q, J=6.7 Hz, 2H), 1.66 (p, J=6.6 Hz, 2H), 1.41-1.19 (m, 8H), 0.92-0.83 (m, 3H).

$^{31}$P NMR (162 MHz, Chloroform-d) δ 21.89.

$^{13}$C NMR (101 MHz, Chloroform-d) δ 134.92, 126.20 (d, J=189.2 Hz), 66.02 (d, J=6.1 Hz), 31.84, 30.48 (d, J=7.0 Hz), 28.96, 25.57, 22.71, 14.19.

IR $v_{max}$(film) 3086 (w), 2957 (m), 2930 (s), 2872 (m), 2858 (m), 2594 (w, br), 2280 (w), 1615 (m), 1468 (m), 1457 (m), 1402 (m), 1276 (m), 1208 (s), 1064 (s), 1053 (s), 1013 (vs), 988 (vs), 850 (m), 727 (m), 607 (m).

HR-MS (ESL): For C$_9$H$_{18}$O$_3$P (M–H)$^-$ m/z calculated 205.09990, found 205.10001±0.49665 ppm.

Example 5: Octyl Vinylphosphonate

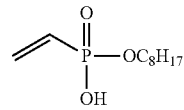

Octyl vinylphosphonate is prepared from mono methyl vinylphosphonate (4.0 g, 32.8 mmol) and 1-octanol using general method B1 and general method A in 27% (1.92 g, 8.86 mmol) overall yield in the form of colorless oil.

$^1$H NMR (401 MHz, Chloroform-d) δ 6.43-5.94 (m, 3H), 4.00 (q, J=6.8 Hz, 2H), 1.66 (dt, J=8.1, 6.5 Hz, 2H), 1.44-1.18 (m, 10H), 0.95-0.78 (m, 3H).

$^{31}$P NMR (162 MHz, Chloroform-d) δ 22.38.

$^{13}$C NMR (101 MHz, Chloroform-d) δ 134.87 (d, J=2.0 Hz), 126.27 (d, J=189.4 Hz), 65.95 (d, J=6.1 Hz), 31.92, 30.49 (d, J=6.6 Hz), 29.32, 29.27, 25.63, 22.78, 14.23.

IR $v_{max}$(CHCl$_3$) 3089 (vw), 2958 (s), 2929 (vs), 2872 (s), 2858 (s), 2673 (w, vbr), 2338 (w, vbr), 1673 (m, vbr), 1615 (m), 1468 (m), 1458 (m), 1403 (m), 1379 (w), 1277 (m), 1196 (s), ~1061 (s, sh), 1025 (vs), 986 (vs), 855 (w), 605 (w).

HR-MS (APCI$^+$): For C$_{10}$H$_{22}$O$_3$P (M+H)$^+$ m/z calculated 221.13011, found 221.12992±0.83273 ppm.

Example 6: Decyl Vinylphosphonate

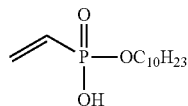

Decyl vinylphosphonate is prepared from mono methyl vinylphosphonate (9.98 g, 81.8 mmol) and 1-octanol (12.9 mL, 81.8 mmol) using general method B1 and general method A in 41% (8.52 g, 34.3 mmol) overall yield in the form of colorless oil.

$^1$H NMR (401 MHz, Chloroform-d) δ 10.98 (brs, 1H), 6.35-5.99 (m, 3H), 3.99 (q, J=6.8 Hz, 2H), 1.71-1.62 (m, 2H), 1.40-1.19 (m, 14H), 0.91-0.84 (m, 3H).

$^{31}$P NMR (162 MHz, Chloroform-d) δ 22.13.

$^{13}$C NMR (101 MHz, Chloroform-d) δ 134.86, 126.27 (d, J=189.3 Hz), 65.97 (d, J=6.1 Hz), 32.03, 30.50 (d, J=6.6 Hz), 29.68, 29.66, 29.45, 29.31, 25.63, 22.82, 14.26.

IR $v_{max}$(CHCl$_3$) 3090 (vw), 2957 (vs), 2928 (vs), 2872 (s), 2856 (vs), 2731 (m, br), 2675 (m, vbr), 2327 (m, br), 2174 (m, br, sh), 1667 (m, vbr), 1615 (s), 1467 (s), 1458 (m), 1403 (s), 1379 (m), 1277 (m), 1197 (vs), 1024 (vs, br), 986 (vs, br), 901 (m). P HR-MS (ESI$^+$): For C$_{12}$H$_{25}$O$_3$NaP (M+Na)$^+$ m/z calculated 271.14335, found 271.14340±0.18190 ppm; for C$_{12}$H$_{26}$O$_3$P (M+H)$^+$ m/z calculated 249.16141, found 249.16152±0.45265 ppm.

Example 7: Phenethyl Vinylphosphonate

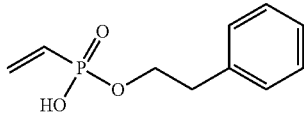

Phenethyl vinylphosphonate is prepared from mono methyl vinylphosphonate (7.0 g, 57.5 mmol) and phenethyl bromide (98%, 8.56 mL, 61.4 mmol) using general method C and general method A in 36% (4.42 g, 20.7 mmol) overall yield in the form of colorless oil.

$^1$H NMR (401 MHz, Chloroform-d) δ 8.49 (brs, 1H), 7.39-7.12 (m, 5H), 6.43-5.73 (m, 3H), 4.18 (q, J=7.4 Hz, 2H), 2.98 (t, J=7.2 Hz, 2H).

$^{31}$P NMR (162 MHz, Chloroform-d) δ 22.26.

$^{13}$C NMR (101 MHz, Chloroform-d) δ 137.28, 135.12, 129.17, 128.64, 126.81, 125.94 (d, J=189.4 Hz), 66.23 (d, J=6.0 Hz), 37.02 (d, J=6.6 Hz).

IR $v_{max}$(film) 3086 (w), 3063 (w), 3029 (w), 2867 (w), 1614 (w), 1605 (m), 1497 (m), 1473 (w), 1454 (m), 1402 (m), 1276 (m), 1216 (s), 1179 (m), 1154 (m), 1061 (s), 1019 (vs), 1002(s), 988 (vs), 748 (s), 699 (s), 496 (m).

HR-MS (ESI$^+$): For C$_{10}$H$_{13}$O$_3$NaP (M+Na)$^+$ m/z calculated 235.04945, found 235.04909±1.55059 ppm. For C$_{10}$H$_{14}$O$_3$P (M+H)$^+$ m/z calculated 213.06751, found 213.06721±1.37212 ppm.

Example 8: 2-(adamantan-1-yl)ethyl vinylphosphonate

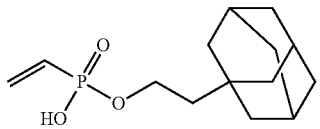 [SMILES: C=CP(=O)(O)OCCC12CC3CCC(CC(C3)C1)C2]

2-(Adamantan-1-yl)ethyl vinylphosphonate is prepared from mono methy vinylphosphonate (0.63 g, 5.18 mmol) and 2-(adamantan-1-yl)ethanol using general method B1 and general method A in overall 40% yield (0.56 g, 2.07 mmol) in the form of white foam.

$^1$H NMR (400.1 MHz, CDCl$_3$): $^1$H NMR (401 MHz, CDCl$_3$) δ 1.37-1.46 (m, 2H); 1.49 (m, 6H); 1.51-1.75 (m, 6H); 1.91-1.92 (m, 3H); 3.60-4.09 (m, 2H); 5.75-6.12 (m, 3H).

$^{31}$P{$^1$H} NMR (162.0 MHz, CDCl$_3$): δ 16.79.

IR $v_{max}$ (CHCl$_3$) 3083 (vw), 2960 (m, sh), 2926 (s), 2904 (vs), 2849 (s), 2753-2637 (vw), 1160 (w, vbr), 1614 (w), 1451 (m), 1400 (m), 1362 (vw), 1346 (m), 1276 (m), 1201 (s), 1106 (m), 1072 (s), 1046 (s), 1029 (s, sh), 1018 (s), 989 (s), 972 (s), 811 (m), 437 (w).

HR-MS (ESI$^-$): For C$_{14}$H$_{22}$O$_3$P (M−H)$^-$ m/z calcd 269.13120, found 269.13132.

Example 9: (adamantan-1-yl)methyl vinylphosphonate

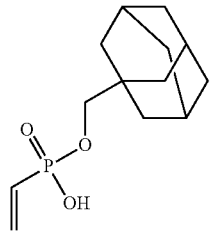 [SMILES: C=CP(=O)(O)OCC12CC3CCC(CC(C3)C1)C2]

(Adamantan-1-yl)methyl vinylphosphonate is prepared from mono methy vinylphosphonate (1.68 g, 13.8 mmol) and (adamantan-1-yl)methanol using general method B1 and general method A in overall 40% yield (8.87 g, 34.61 mmol) bezbarvého oleje.

$^1$H NMR (401 MHz, Chloroform-d) δ 1.53 (s, 6H), 1.59-1.79 (m, 6H), 1.98 (s, 3H), 3.55 (d, J=5.8 Hz, 2H), 5.58-6.77 (m, 3H), 10.61 (s, 1H).

$^{13}$C NMR (101 MHz, Chloroform-d) δ 28.14, 33.86 (d, J=7.1 Hz), 38.96, 75.31, 75.37, 76.84, 77.16, 77.48, 126.23 (d, J=189.8 Hz), 134.73 (d, J=1.8 Hz).

$^{31}$P NMR (162 MHz, Chloroform-d) δ 22.39.

IR $v_{max}$ (CHCl$_3$) 3090 (vw), 2940 (vs, sh), 2906 (vs), 2851 (vs), 2799, 2777, 2720 (m, vbr), 2660, 2326 (m, vbr), 1666 (m, vbr), 1616 (m), 1462 (m), 1453 (m), 1403 (m), 1387 (w), 1365 (w), 1276 (m), 1196 (s), 1191 (s), 1106 (m), 1060 (s), 1029 (vs, br), 1002 (vs), 987 (vs), 975 (vs), 942 (m), 923 (m), 809 (m), 437 (w).

HR-MS (ESI$^+$) For C$_{13}$H$_{21}$O$_3$NaP (M+Na)$^+$ calcd 279.11205, found 279.11202.

Example 10: 3-(cyclohexyl)propyl vinylphosphonate

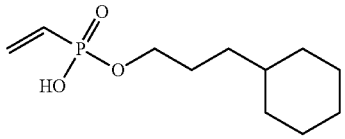

3-(Cyclohexyl)propyl vinylphosphonate is prepared from mono methyl vinylphosphonate (5 g, 40.96 mmol) and 3-(cyclohexyl)propanol (8.32 g, 58.52 mmol) general method B2 and general method A in 32% (3-01 g, 12-96 mmol) overall yield in the form of colorless oil.

$^1$H NMR (401 MHz, Chloroform-d) δ 0-71-0-99 (m, 2H), 1.02-1.44 (m, 6H), 1.47-1.93 (m, 7H), 3.84-4.15 (m, 2H), 5.74-6.49 (m, 3H), 9.98 (s, 1H).

$^{13}$C NMR (101 MHz, Chloroform-d) δ 26.15, 26.45, 27.60 (d, J=6.7 Hz), 32.92, 33.08, 37.10, 65.97 (d, J=6.1 Hz), 76.53, 76.84, 77.16, 126.01 (d, J=189.2 Hz), 134.49 (d, J=1.8 Hz).

$^{31}$P NMR (162 MHz, Chloroform-d) δ 22.18.

IR $v_{max}$ (CHCl$_3$) 3090 (vw), 2926 (vs), 2853 (s), 2710 (w, vbr), 2330 (m, vbr), 1669 (m, vbr), 1615 (m), 1474 (w), 1463 (w), 1449 (m), 1403 (m), 1276 (w), 1198 (s), 1068 (s), 1053 (s), 1041 (s), 1013 (vs), 986 (vs).

HR-TOF MS CI+ For C$_{11}$H$_{22}$O$_3$P (M+H)$^+$ calcd 233.1307, found 233.1310.

Example 11: (Z)-non-3-en-1-yl vinylphosphonate

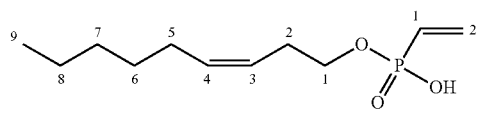

(Z)-non-3-en-1-yl vinylphosphonate is prepared from mono methyl vinylphosphonate (3.0 g, 24.6 mmol) and (Z)-non-3-en-1-ol using general method B1 and general method A in 35% (2.0 g, 8.61 mmol) overall yield in the form of colorless oil.

$^1$H NMR (401 MHz, Methanol-d$_4$) δ 0.87-0.95 (m, 3H), 1.23-1.44 (m, 6H), 2.06 (qd, J=7.3, 1.3 Hz, 2H), 2.41 (qd, J=7.0, 1.4 Hz, 2H), 3.92 (q, J=7.0 Hz, 2H), 5.38 (ddd, J=10.9, 7.1, 1.4 Hz, 1H), 5.51 (dtt, J=10.3, 7.2, 1.5 Hz, 1H), 5.97-6.27 (m, 3H).

$^{13}$C NMR (101 MHz, Methanol-d$_4$) δ 14.41, 23.61, 29.72 (d, J=6.6 Hz), 29.75, 30.40, 32.62, 48.36, 48.58, 48.79, 49.00, 49.21, 49.42, 49.64, 66.04 (d, J$_{C,P}$=5.7 Hz), 125.37, 128.92 (d, J=181.4 Hz), 133.87, 134.31 (d, J=1.4 Hz).

$^{31}$P NMR (162 MHz, Methanol-d$_4$) δ 18.44.

IR $v_{max}$ (KBr) 3088 (vw), 2959 (s), 2930 (s), 2873 (m), 2858 (s), 2733 (w), 2669 (w, vbr), 2337 (m, br), 1660 (m, vbr), 1655 (w), 1615 (m), 1468 (m), 1460 (m), 1403 (m), 1380 (w), 1277 (m), 1198 (s), 1165 (s, sh), 1155 (s), 1023 (vs), 986 (vs).

HR-MS (ESI$^+$) For C$_{11}$H$_{21}$O$_3$NaP (M+Na)$^+$ calcd 255.11205, found 255.11186.

Example 12: (Z)-hept-3-en-1-yl vinylphosphonate

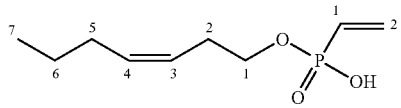

(Z)-hept-3-en-1-yl vinylphosphonate is prepared from mono methyl vinylphosphonate (5.0 g, 41.0 mmol) and 1-hexanol using general method B2 and general method A in 46% (3.42 g, 19.6 mmol) overall yield in the form of colorless oil.

$^1$H NMR (400.1 MHz, CDCl$_3$): 0.89 (m, 3H), 1.32-1.41 (m, 2H), 1.98-2.04 (m, 2H), 2.35-2.46 (m, 2H), 3.98 (q, 2H, J$_{vic}$=7.2), 5.31-5.38 (m, 1H), 5.47-5.54 (m, 1H), 5.99-6.34 (m, 3H), 11.10 (s, 1H).

$^{13}$C NMR (100.6 MHz, CDCl$_3$): 13.73, 22.67, 28.59 (d, J$_{C,P}$=7.0), 29.36, 65.06 (d, J$_{C,P}$=6.0), 123.80, 126.13 (d, J$_{C,P}$=189.1), 133.05, 134.72 (d, J$_{C,P}$=2.0).

$^1$P{$^1$H} NMR (162.0 MHz, CDCl$_3$): 21.58.

IR $v_{max}$ (KBr) 3091 (w), 3013 (m), 2960 (m), 2931 (m), 2873 (s), 2700-2100 (w, vbr), 1665 (w), 1657 (w), 1615 (w), 1466 (w), 1458 (w), 1403 (m), 1379 (vw), 1277 (w), 1210 (m), 1144 (m, sh), 1066 (m), 1016 (vs), 1023 (vs), 989 (vs), 849 (w).

HR-ESI(ESI$^+$) For C$_9$H$_{16}$O$_3$P (M−H)$^−$ calcd 203.08425, found 203.08435.

Example 13: (Z)-oct-3-en-1-yl vinylphosphonate

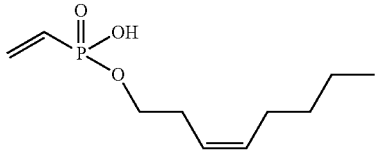

(Z)-oct-3-en-1-yl vinylphosphonate is prepared from mono methyl vinylphosphonate (4.0 g, 32.8 mmol) and (Z)-oct-3-en-1-ol using general method B2 and general method A in 60% (3.42 g, 15.7 mmol)

$^1$H NMR (400.1 MHz, CDCl$_3$): 0.86-0.92 (m, 3H), 1.25-1.37 (m, 4H), 2.0-2.06 (m, 2H), 2.35-2.46 (m, 2H), 3.98 (q, 2H, J$_{vic}$=12.0), 5.30-5.37 (m, 1H), 5.47-5.54 (m, 1H), 5.99-6.34 (m, 3H), 10.79 (s, 1H).

$^{13}$C NMR (100.6 MHz, CDCl$_3$): 13.96, 22.30, 27.04, 28.57 (d, J$_{C,P}$=7.0), 31.72, 65.06 (d, J$_{C,P}$=6.0, 123.59, 126.12 (d, J$_{C,P}$=189.1), 133.27, 134.73 (d, J$_{C,P}$=2.0).

$^1$P{$^1$H} NMR (162.0 MHz, CDCl$_3$): 21.66.

IR $v_{max}$ (KBr) 3090 (w), 2960 (s), 2930 (s), 2873 (s), 2860 (s), 2734 (m, br), 2672 (m, vbr), 2330 (m, vbr), 2169 (m, vbr), 1665 (m, vbr), 1654 (m), 1615 (m), 1467 (m), 1458 (m), 1403 (s), 1379 (m), 1277 (m), 1198 (s), 1066 (s), 1053 (s), 1023 (vs), 986 (vs), 894 (w).

HR-MS (ESI$^+$) For C$_{10}$H$_{19}$O$_3$NaP (M+Na)$^+$ calcd 241.09640, found 241.09653.

Example 14: Isobutyl Vinylphosphonate

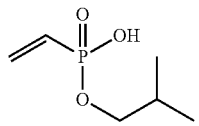

Isobutyl vinylphosphonate is prepared from mono methyl vinylphosphonate (4.03 g, 33.0 mmol) and isobutyl alcohol (3.71 mL, 40.0 mmol) using general method B1 and general method A in 37% (2.00 g, 12.2 mmol) overall yield in the form of colorless oil.

$^1$H NMR (401 MHz, Chloroform-d) δ 6.45 (brs, 1H), 6.36-5.98 (m, 3H), 3.77 (t, J=6.6 Hz, 2H), 1.95 (dt, J=13.3, 6.7 Hz, 1H), 0.94 (d, J=6.7 Hz, 6H).

$^{31}$P NMR (162 MHz, Chloroform-d) δ 22.26.

$^{13}$C NMR (101 MHz, Chloroform-d) δ 134.69, 126.11 (d, J=189.6 Hz), 71.63 (d, J=6.6 Hz), 29.06 (d, J=7.0 Hz), 18.69 (d, J=1.8 Hz).

IR $v_{max}$ (CHCl$_3$) 3088 (w), 2962 (m), 2877 (m), 2853 (w), 2585 (m, br), 2278 (m, br), 1673 (m), 1615 (m), 1472 (m), 1403 (m), 1370 (w), 1278 (m), 1206 (s), 1032 (vs), 989 (s), 854 (m), 732 (m), 610 (m).

HR-MS (ESI$^+$): For C$_6$H$_{13}$O$_3$NaP (M+Na)$^+$m/z calculated 187.04945, found 187.04957±0.64909 ppm.

Example 15: Di((Z)-oct-3-en-1-yl) propane-1,3-diyl bis(vinylphosphonate)

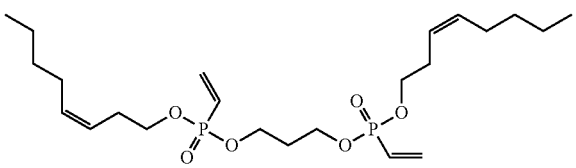 [SMILES: C=CP(=O)(OCC/C=C\CCCC)OCCCOP(=O)(C=C)OCC/C=C\CCCC]

Di((Z)-oct-3-en-1-yl) propan-1,3-diyl bis(vinylphosphonate) is prepared from compound in Example 13 (0.9 g, 4.12 mmol) and 1,3-dibromopropane (0.32 g, 1.37 mmol) using general method C in 73% (0.48 g, 1.01 mmol) overall yield in the form of colorless oil.

$^1$H NMR (400.1 MHz, CDCl$_3$): 0.86-0.94 (m, 6H), 1.25-1.36 (m, 8H), 1.42-1.50 (m, 2H), 1.65-1.73 (m, 4H), 2.0-2.06 (m, 4H), 2.35-2.45 (m, 4H), 3.97-4.04 (m, 8H), 5.30-5.37 (m, 2H), 5.47-5.54 (m, 2H), 5.97-6.35 (m, 6H).

$^{13}$C NMR (100.6 MHz, CDCl$_3$): 13.97, 21.69, 22.31, 27.07, 28.68 (d, J$_{P,C}$=7.0), 29.99 (d, J$_{C,P}$=7.0), 31.71, 65.28, 65.48 (d, J$_{C,P}$=6.0), 123.68, 125.75 (d, J$_{C,P}$=184.1), 133.28, 135.63 (d, J$_{C,P}$=3.0).

$^{31}$P{$^1$H} NMR (162.0 MHz, CDCl$_3$): 19.87.

IR $v_{max}$ (KBr) 3086 (w), 3011 (m), 2957 (s), 2929 (s), 2872 (m), 2860 (m), 1613 (w), 1467 (m), 1363 (w), 1278 (m, sh), 1251 (vs), 1184 (w), 1054 (s), 1007 (vs), 970 (s, sh), 726 (m), 608 (m).

HR-MS (ESI$^+$) For C$_{25}$H$_{47}$O$_6$P$_2$ (M+H)$^+$ calcd 505.28424, found 505.28375.

Example 16: Di((Z)-oct-3-en-1-yl) pentane-1,5-diyl bis(vinylphosphonate)

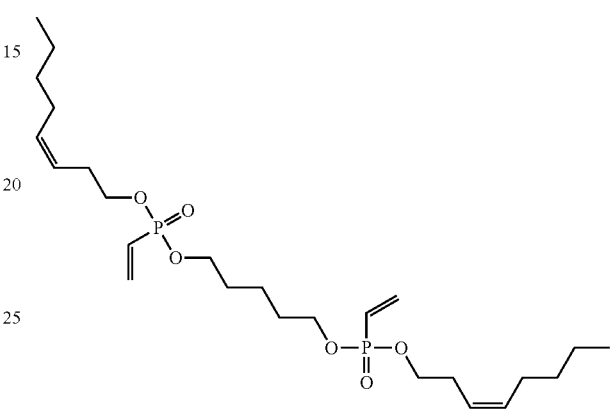

Di((Z)-oct-3-en-1-yl) pentane-1,5-diyl bis(vinylphosphonate) is prepared from compound in Example 13 (0.9 g, 4.12 mmol) and 1,5-dibromopropane (0.32 g, 1.37 mmol) using general method C in 79% (0.56 g, 1.11 mmol) overall yield in the form of colorless oil.

$^1$H NMR (400.1 MHz, CDCl$_3$): 0.86-0.94 (m, 6H), 1.25-1.36 (m, 8H), 1.42-1.50 (m, 2H), 1.65-1.73 (m, 4H), 2.0-2.06 (m, 4H), 2.35-2.45 (m, 4H), 3.97-4.04 (m, 8H), 5.30-5.37 (m, 2H), 5.47-5.54 (m, 2H), 5.97-6.35 (m, 6H).

$^{13}$C NMR (100.6 MHz, CDCl$_3$): 13.97, 21.69, 22.31, 27.07, 28.68 (d, J$_{P,C}$=7.0), 29.99 (d, J$_{C,P}$=7.0), 31.71, 65.28, 65.48 (d, J$_{C,P}$=6.0), 123.68, 125.75 (d, J$_{C,P}$=184.1), 133.28, 135.63 (d, J$_{C,P}$=3.0).

$^{31}$P{$^1$H} NMR (162.0 MHz, CDCl$_3$): 19.87.

IR $v_{max}$ (KBr) 3086 (w), 3011 (m), 2957 (s), 2929 (s), 2872 (m), 2860 (m), 1613 (w), 1467 (m), 1363 (w), 1278 (m, sh), 1251 (vs), 1184 (w), 1054 (s), 1007 (vs), 970 (s, sh), 726 (m), 608 (m).

HR-MS (ESI$^+$) For C$_{25}$H$_{47}$O$_6$P$_2$ (M+H)$^+$ calcd 505.28424, found 505.28375.

Example 17: Di((Z)-oct-3-en-1-yl) hexane-1,5-diyl bis(vinylphosphonate)

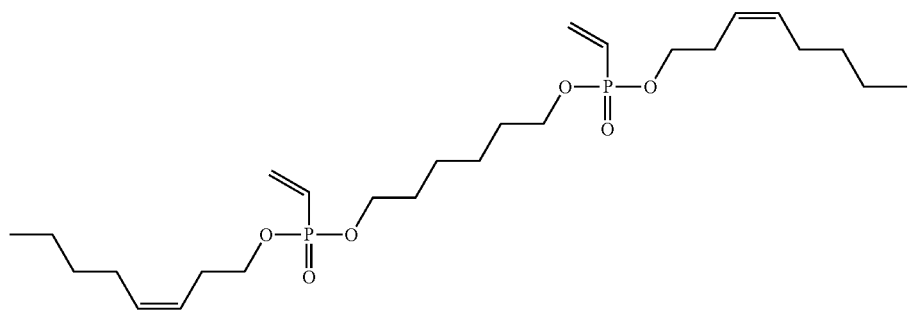 [SMILES: C=CP(=O)(OCC/C=C\CCCC)OCCCCCCOP(=O)(C=C)OCC/C=C\CCCC]

Hexan-1,6-diyl di((Z)-oct-3-en-1-yl) bis(vinylphosphonate) is prepared from compound in Example 13 (0.9 g, 4.12 mmol) and 1,6-dibromohexane (0.32 g, 1.37 mmol) using general method C in 83% (0.59 g, 1.14 mmol) overall yield in the form of colorless oil.

$^1$H NMR (400.1 MHz, CDCl$_3$): 0.86-0.92 (m, 6H), 1.25-1.35 (m, 8H), 1.36-1.41 (m, 4H), 1.62-1.70 (m, 4H), 2.0-2.06 (m, 4H), 2.39-2.45 (m, 4H), 3.97-4.03 (m, 8H), 5.30-5.37 (m, 2H), 5.47-5.54 (m, 2H), 5.97-6.34 (m, 6H).

$^{13}$C NMR (100.6 MHz, CDCl$_3$): 13.96, 22.31, 25.15, 27.07, 28.67 (d, $J_{C,P}$=6.0), 30.35 (d, $J_{C,P}$=7.0), 31.71, 65.26 (d, $J_{C,P}$=6.0), 65.67 (d, $J_{C,P}$=6.0), 123.70, 125.78 (d, $J_{C,P}$=184.1), 133.26, 135.58 (d, $J_{C,P}$=3.0).

$^1$P{$^1$H} NMR (162.0 MHz, CDCl$_3$): 19.83.

IR $v_{max}$ (KBr) 3085 (w), 3011 (m), 2956 (s), 2929 (s), 2871 (m), 2859 (m), 1654 (w), 1613 (w), 1467 (m), 1398 (m), 1278 (m, sh), 1251 (s), 1053 (s), 1003 (s), 970 (s, sh), 854 (m), 729 (m), 698 (m).

HR-MS (ESI$^+$) For C$_{26}$H$_{49}$O$_6$P$_2$ (M+H)$^+$ calcd 519.29989, found 519.29947.

Example 18: Di((Z)-hept-3-en-1-yl) hexane-1,6-diyl bis(vinylphosphonate)

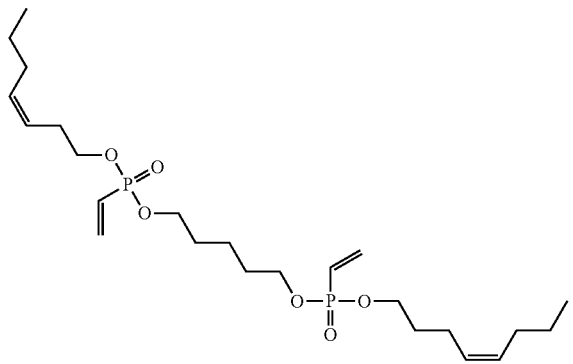 [SMILES: C=CP(=O)(OCC/C=C\CCC)OCCCCCOP(=O)(C=C)OCCC/C=C\CCC]

Di((Z)-hept-3-en-1-yl) hexane-1,6-diyl bis(vinylphosphonate) is prepared from compound in Example 12 (1.10 g, 5.39 mmol) and 1,6-dibromohexane (0.44 g, 1.80 mmol) using general method C in 79% (0.68 g, 1.42 mmol) overall yield in the form of colorless oil.

$^1$H NMR (400.1 MHz, CDCl$_3$): 0.89 (m, 6H), 1.32-1.43 (m, 8H), 1.62-1.70 (m, 4H), 1.98-2.04 (m, 4H), 2.39-2.45 (m, 4H), 3.96-4.03 (m, 8H), 5.31-5.38 (m, 2H), 5.47-5.54 (m, 2H), 5.97-6.34 (m, 6H).

$^{13}$C NMR (100.6 MHz, CDCl$_3$): 13.74, 22.66, 25.15, 28.69 (d, $J_{C,P}$=6.0), 29.39, 30.35 (d, $J_{C,P}$=7.0), 65.24 (d, $J_{C,P}$=6.0), 65.66 (d, $J_{C,P}$=6.0), 123.91, 125.80 (d, $J_{C,P}$=184.1), 133.04, 135.56 (d, $J_{C,P}$=2.0).

$^1$P{$^1$H} NMR (162.0 MHz, CDCl$_3$): 19.84.

IR $v_{max}$ (KBr) 3085 (vw), 3011 (m), 2958 (s), 2931 (m), 2871 (m), 1654 (w), 1613 (w), 1465 (m), 1398 (m), 1280 (m, sh), 1251 (vs), 1066 (vs), 1053 (vs), 1003 (vs), 976 (s, sh), 851 (m), 727 (m).

HR-MS (ESI$^+$) For C$_{24}$H$_{45}$O$_6$P$_2$ (M+H)$^+$ calcd 491.26859, found 491.26863.

Example 19: Di((Z)-hept-3-en-1-yl) pentane-1,5-diyl bis(vinylphosphonate)

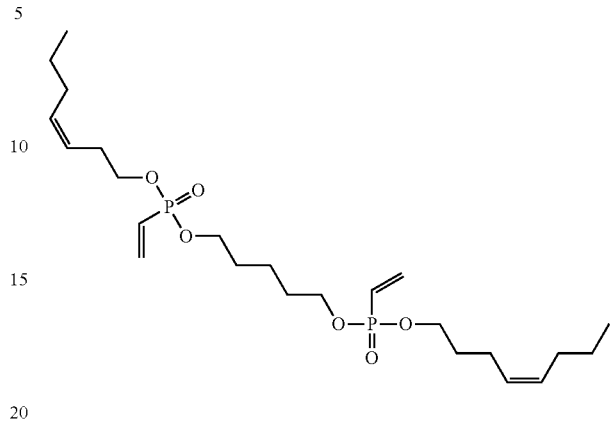

Di((Z)-hept-3-en-1-yl) pentane-1,5-diyl bis(vinylphosphonate) is prepared from compound in Example 12 (1.10 g, 5.39 mmol) and 1,6-dibromopentane (0.40 g, 1.80 mmol) using general method C in 84% (0.72 g, 1.50 mmol) overall yield in the form of colorless oil.

$^1$H NMR (400.1 MHz, CDCl$_3$): 0.88 (m, 6H), 1.29-1.39 (m, 4H), 1.41-1.49 (m, 2H), 1.65-1.72 (m, 4H), 1.97-2.03 (m, 4H), 2.38-2.44 (m, 4H), 3.96-4.03 (m, 8H), 5.30-5.38 (m, 2H), 5.46-5.53 (m, 2H), 5.96-6.33 (m, 6H).

$^{13}$C NMR (100.6 MHz, CDCl$_3$): 13.74, 21.68, 22.65, 28.68 (d, $J_{C,P}$32 6.0), 29.38, 29.97 (d, $J_{C,P}$32 7.0), 65.27, 65.42 (d, $J_{C,P}$=6.0, 5.0), 123.88, 125.73 (d, $J_{C,P}$=184.1), 133.05, 135.62 (d, $J_{C,P}$=2.0).

$^1$P{$^1$H} NMR (162.0 MHz, CDCl$_3$): 19.86.

IR $v_{max}$ (KBr) 3086 (vw), 3011 (m), 2960 (s), 2930 (m), 2872 (m), 1656 (w), 1613 (w), 1466 (m), 1457 (m, sh), 1380 (w), 1281 (m), 1252 (s), 1066 (vs), 1051 (vs), 1011 (vs), 981 (s, sh), 722 (m).

HR-MS (ESI$^+$) For C$_{23}$H$_{42}$O$_6$NaP$_2$ (M+Na)$^+$ calcd 499.23488, found 499.23491.

Example 20: Hexane-1,6-diyl dihexyl bis(vinylphosphonate)

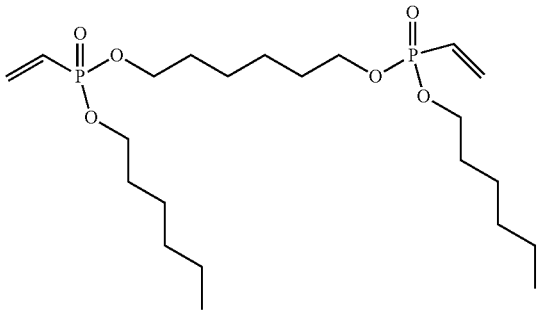 [SMILES: C=CP(=O)(OCCCCCC)OCCCCCCOP(=O)(C=C)OCCCCCC]

Hexane-1,6-diyl dihexyl bis(vinylphosphonate) is prepared from compound in Example 3 (1.20 g, 6.24 mmol) and 1,6-dibromohexane (0.51 g, 2.08 mmol) using general method C in 71% (0.69 g, 1.48 mmol) overall yield in the form of colorless oil.

$^1$H NMR (400.1 MHz, CDCl$_3$): 0.86-0.90 (m, 6H), 1.24-1.43 (m, 16H), 1.62-1.71 (m, 8H), 3.97-4.02 (m, 8H), 5.97-6.33 (m, 6H).

$^{13}$C NMR (100.6 MHz, CDCl$_3$): 13.98, 22.52, 25.16, 25.18, 31.33, 30.39 (d, J$_{C,P}$=7.0, 6.0), 65.63, 66.98 (d, J$_{C,P}$=6.0, 5.0), 135.47 (d, J$_{C,P}$=183.1), 135.47 (d, J$_{C,P}$=3.0).

$^{31}$P{$^1$H} NMR (162.0 MHz, CDCl$_3$): 19.82.

IR v$_{max}$ (KBr) 3090 (vw), 2959 (s), 2934 (s), 2872 (m), 2861 (m), 1614 (w), 1468 (m), 1460 (m, sh), 1455 (m, sh), 1400 (m), 1380 (w), 1279 (m), 1241 (s), 1058 (s), 1039 (s), 1010 (vs, sh), 998 (vs), 862 (m).

HR-MS (ESI$^+$) For C$_{22}$H$_{45}$O$_6$P$_2$ (M+H)$^+$ calcd 467.26859, found 467.26821.

Example 21: Dihexyl octane-1,8-diyl bis(vinylphosphonate)

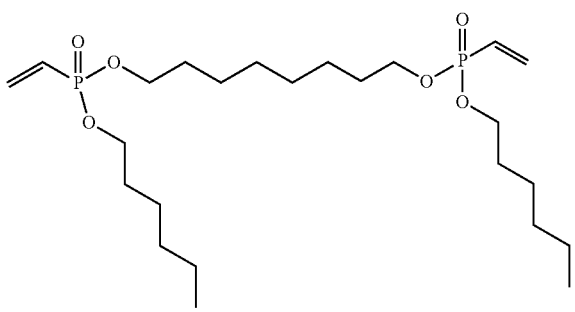 [SMILES: C=CP(=O)(OCCCCCC)OCCCCCCCCOP(=O)(C=C)OCCCCCC]

Dihexyl octane-1,8-diyl bis(vinylphosphonate) is prepared from compound in Example 3 (1.0 g, 5.20 mol) and 1,8-dibromooctane (0.64 g, 1.74 mmol) using general method C in 74% (0.64 g, 1.29 mmol) overall yield in the form of colorless oil.

$^1$H NMR (400.1 MHz, CDCl$_3$): 0.83-0.90 (m, 6H), 1.24-1.40 (m, 20H), 1.62-1.70 (m, 8H), 3.97-4.11 (m, 8H), 5.97-6.34 (m, 6H).

$^{13}$C NMR (100.6 MHz, CDCl$_3$): 13.98, 22.52, 25.18, 25.45, 29.04, 31.33, 30.43 (d, J$_{C,P}$=6.0), 65.81, 65.94 (d, J$_{C,P}$=5.0), 125.91 (d, J$_{C,P}$=184.1), 135.38 (d, J$_{C,P}$=3.0).

$^{31}$P{$^1$H} NMR (162.0 MHz, CDCl$_3$): 19.77.

IR v$_{max}$ (KBr) 3091 (vw), 2959 (s), 2934 (s), 2872 (m), 2860 (w), 1614 (w), 1468 (w), 1456 (w, sh), 1434 (w), 1400 (m), 1279 (w), 1241 (s), 1059 (s), 1040 (s, sh), 1009 (vs), 998 (vs), 606 (w).

HR-MS (ESI$^+$) For C$_{24}$H$_{49}$O$_6$P$_2$ (M+H)$^+$ calcd 495.29989, found 495.29906.

Example 22: Decane-1,10-diyl dihexyl bis(vinylphosphonate)

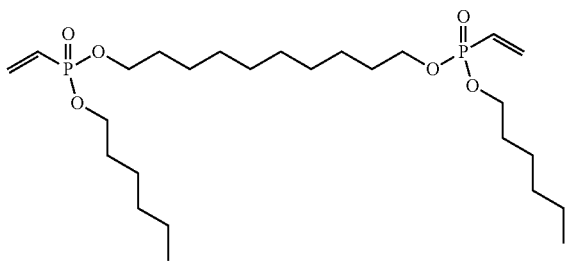 [SMILES: C=CP(=O)(OCCCCCC)OCCCCCCCCCCOP(=O)(C=C)OCCCCCC]

Decane-1,10-diyl dihexyl bis(vinylphosphonate) is prepared from compound in Example 3 (1.0 g, 5.20 mmol) and 1,10-dibromodecane (0.62 g, 1.74 mmol) using general method C in 75% (0.68 g, 1.31 mmol) overall yield in the form of colorless oil.

$^1$H NMR (400.1 MHz, CDCl$_3$): 0.85-0.90 (m, 6H), 1.25-1.40 (m, 24H), 1.62-1.69 (m, 8H), 3.96-4.04 (m, 8H), 5.97-6.33 (m, 6H).

$^{13}$C NMR (100.6 MHz, CDCl$_3$): 13.98, 22.52, 25.18, 25.51, 29.14, 29.42, 31.33, 30.42, 30.48 (d, J$_{C,P}$=6.0), 65.88, 65.93 (d, J$_{C,P}$=6.0), 125.92 (d, J$_{C,P}$=184.1), 135.35 (d, J$_{C,P}$=2.0).

$^{31}$P{$^1$H} NMR (162.0 MHz, CDCl$_3$): 19.76.

IR v$_{max}$ (KBr) 3091 (vw), 2959 (s), 2932 (vs), 2872 (m), 2858 (m), 1614 (w), 1468 (m), 1458 (w), 1434 (w), 1400 (m), 1380 (w), 1279 (w), 1241 (s), 1058 (s), 1038 (s, sh), 1007 (vs), 997 (vs), 606 (w).

HR-MS (ESI$^+$) For C$_{26}$H$_{53}$O$_6$P$_2$ (M+H)$^+$ calcd 523.33119, found 523.33031.

Example 23: Dihexyl tetradecane-1,14-diyl bis(vinylphosphonate)

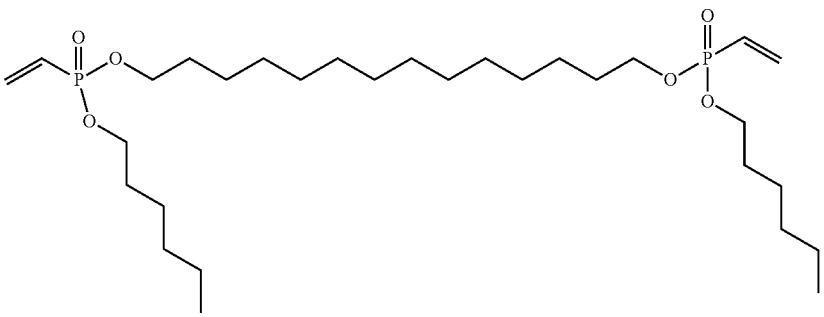 [SMILES: C=CP(=O)(OCCCCCC)OCCCCCCCCCCCCCCOP(=O)(C=C)OCCCCCC]

Dihexyl tetradecane-1,14-diyl bis(vinylphosphonate) is prepared from compound in Example 3 (1.0 g, 5.20 mmol) and 1,14-dibromotetradecane (0.62 g, 1.74 mmol) using general method C in 85% (0.86 g, 1.47 mmol) overall yield in the form of colorless oil.

$^1$H NMR (400.1 MHz, CDCl$_3$): 0.86-0.90 (m, 6H), 1.24-1.39 (m), 1.62-1.69 (m, 8H), 3.95-4.04 (m, 8H), 5.97-6.33 (m, 6H).

$^{13}$C NMR (100.6 MHz, CDCl$_3$): 13.98, 22.52, 25.19, 25.53, 29.17, 29.52, 29.57, 29.62, 31.34, 30.44, 30.48, 65.91 (d, J$_{C,P}$=6.0), 125.95 (d, J$_{C,P}$=184.1), 135.31 (d, J$_{C,P}$=2.0).

$^{31}$P{$^1$H} NMR (162.0 MHz, CDCl$_3$): 19.74.

IR $v_{max}$ (KBr) 3090 (vw); 2958 (s), 2930 (vs), 2871 (m), 2857 (s), 1614 (w), 1468 (m), 1458 (w), 1434 (w), 1400 (m), 1380 (w), 1279 (w), 1241 (s), 1058 (s), 1038 (s), 1010 (vs), 998 (vs), 861 (w), 606 (w).

HR-MS (ESI$^+$) For $C_{30}H_{61}O_6P_2$ (M+H)$^+$ calcd 579.39379, found 579.39286.

Example 24: Octane-1,8-diyl dipentyl bis(vinylphosphonate)

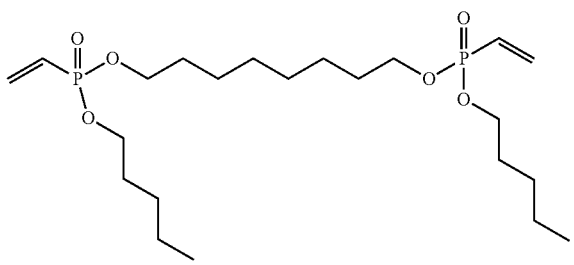 [SMILES: C=CP(=O)(OCCCCC)OCCCCCCCCOP(=O)(C=C)OCCCCC]

Octan-1,8-diyl dipentyl bis(vinylphosphonate) is prepared from compound in Example 2 (1.20 g, 6.73 mmol) and 1,8-dibromooctane (0.61 g, 2.24 mmol) using general method C in 71% (0.75 g, 1.61 mmol) overall yield in the form of colorless oil.

$^1$H NMR (400.1 MHz, CDCl$_3$): 0.84-0.89 (m, 6H), 1.26-1.37 (m, 16H), 1.60-1.68 (m, 8H), 3.95-4.02 (m, 8H), 5.97-6.33 (m, 6H).

$^{13}$C NMR (100.6 MHz, CDCl$_3$): 13.94, 22.21, 25.43, 27.63, 29.02, 30.14, 30.36 (d, $J_{C,P}$=7.0, 6.0), 64.40, 65.79 (d, $J_{C,P}$=6.0, 5.0), 125.86 (d, $J_{C,P}$=184.1), 135.40 (d, $J_{C,P}$=2.0).

$^{31}$P{$^1$H} NMR (162.0 MHz, CDCl$_3$): 20.01.

IR $v_{max}$ (KBr) 3090 (vw), 2960 (s), 2935 (s), 2873 (m), 2860 (m), 1614 (w), 1467 (m), 1400 (m), 1381 (w), 1279 (w), 1240 (s), 1381 (w), 1075 (m, sh), 1051 (s), 1017 (vs), 992 (vs), 855 (w).

HR-MS (ESI$^+$) For $C_{22}H_{44}O_6NaP_2$ (M+Na)$^+$ calcd 489.25053, found 489.25015.

Example 25: Decane-1,8-diyl dipentyl bis(vinylphosphonate)

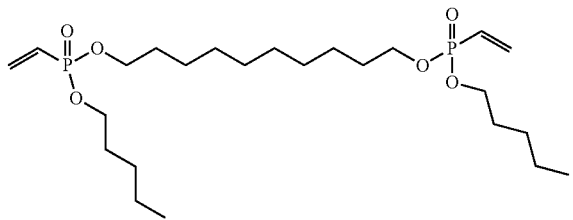 [SMILES: C=CP(=O)(OCCCCC)OCCCCCCCCCCOP(=O)(C=C)OCCCCC]

Decane-1,8-diyldipentyl bis(vinylphosphonate) is prepared from compound in Example 2 (1.20 g, 6.73 mmol) and 1,10-dibromodecane (0.67 g, 2.24 mmol) using general method C in 76% (0.84 g, 1.70 mmol) overall yield in the form of colorless oil.

$^1$H NMR (400.1 MHz, CDCl$_3$): 0.85-0.92 (m, 6H), 1.25-1.39 (m, 20H), 1.62-1.70 (m, 8H), 3.97-4.04 (m, 8H), 5.97-6.33 (m, 6H).

$^{13}$C NMR (100.6 MHz, CDCl$_3$): 13.95, 22.23, 25.51, 27.65, 29.13, 29.41, 30.16, 30.47 (d, $J_{C,P}$=7.0, 6.0), 65.88, 65.91 (d, $J_{C,P}$=6.0, 5.0), 125.92 (d, $J_{C,P}$=184.1), 135.35 (d, $J_{C,P}$=2.0).

$^{31}$P{$^1$H} NMR (162.0 MHz, CDCl$_3$): 19.76.

IR $v_{max}$ (KBr) 3085 (vw), 2956 (s), 2930 (vs), 2857 (s), 1613 (w), 1467 (m), 1458 (m), 1397 (m), 1377 (w,sh), 1280 (m), 1253 (vs), 1018 (vs), 1051 (s), 1074 (m), 990 (vs).

HR-MS (ESI$^+$) For $C_{24}H_{48}O_6NaP_2$ (M+Na)$^+$ calcd 517.28183, found 517.28171.

Example 26: Dodecane-1,12-diyl dipentyl bis(vinylphosphonate)

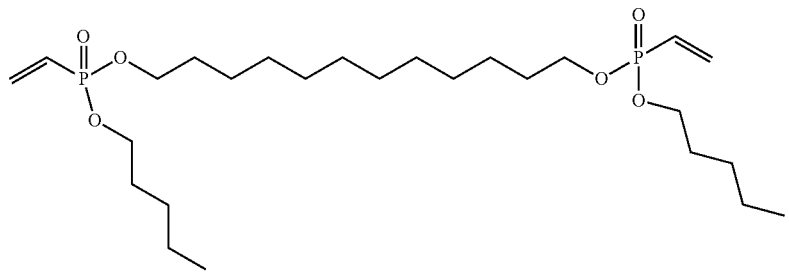 [SMILES: C=CP(=O)(OCCCCC)OCCCCCCCCCCCCOP(=O)(C=C)OCCCCC]

Dodecane-1,8-diyl dipentyl bis(vinylphosphonate) is prepared from compound in Example 2 (1.50 g, 8.42 mmol) and 1,12-dibromododecane (0.92 g, 2.81 mmol) using general method C in 78% (1.15 g, 2.19 mmol) overall yield in the form of colorless oil.

NMR (400.1 MHz, CD$_3$OD): 0.91-0.96 (m, 6H), 1.29-1.43 (m, 24H), 1.65-1.73 (m, 8H), 3.99-4.05 (m, 8H), 6.08-6.32 (m, 6H).

$^{13}$C NMR (100.6 MHz, CD$_3$OD): 12.93, 21.87, 25.24, 27.44, 28.82, 29.24, 29.25, 29.82, 30.09 (d, $J_{C,P}$6.0), 66.05 (d, $J_{C,P}$=6.0), 125.05 (d, $J_{C,P}$=184.1), 135.53 (d, $J_{C,P}$=2.0).

$^{31}$P{$^1$H} NMR (162.0 MHz, CD$_3$OD): 20.44.

IR $v_{max}$ (KBr) 3089 (vw), 3013 (w), 2968 (s), 2930 (vs), 2873 (s), 2857 (s), 1614 (w), 1467 (m), 1458 (m), 1434 (w), 1398 (m), 1381 (w), 1279 (m), 1253 (vs), 1052 (m), 1020 (vs, sh), 989 (vs), 854 (m).

HR-MS (ESI$^+$) For $C_{26}H_{52}O_6NaP_2$ (M+Na)$^+$ calcd 545.31313, found 545.31275.

Example 27: Dipentyl tetradecane-1,14-diyl bis(vinylphosphonate)

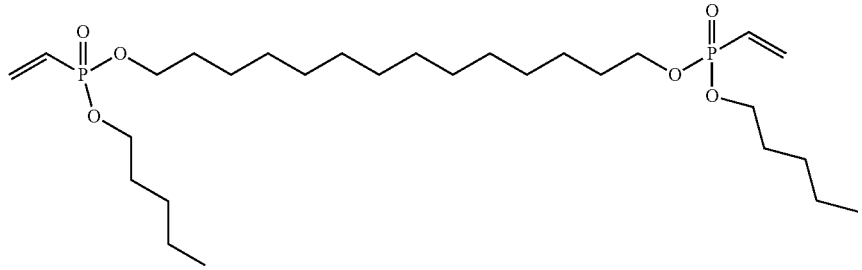 [SMILES: C=CP(=O)(OCCCCC)OCCCCCCCCCCCCCCOP(=O)(C=C)OCCCCC]

Dipentyl tetradecane-1,14-diyl bis(vinylphosphonate) is prepared from compound in Example 2 (1.50 g, 8.42 mmol) and 1,14-dibromotetradecane (1.24 g, 2.25 mmol) using general method C in 80% (1.24 g, 2.25 mmol) overall yield in the form of colorless oil.

$^1$H NMR (400.1 MHz, CD$_3$OD): 0.91-0.96 (m, 6H), 1.31-1.42 (m, 28H), 1.65-1.73 (m, 8H), 3.99-4.05 (m, 8H), 6.08-6.32 (m, 6H).

$^{13}$C NMR (100.6 MHz, CD$_3$OD): 14.33, 23.27, 26.63, 28.84, 30.22, 30.64, 30.68, 30.75, 31.22, 31.49 (d, $J_{C,P}$=7.0, 6.0), 67.44 (d, $J_{C,P}$=6.0), 126.44 (d, $J_{C,P}$=185.1), 136.92 (d, $J_{C,P}$=2.0).

$^1$P{$^1$H} NMR (162.0 MHz, CD$_3$OD): 20.44.

IR $v_{max}$ (KBr) 3090 (vw), 2960 (s), 2930 (vs), 2873 (m), 2857 (s), 1467 (m), 1455 (w, sh), 1381 (w), 1279 (m), 1240 (s), 1050 (s), 1021 (vs, sh), 993 (vs).

HR-MS (ESI$^+$) For C$_{28}$H$_{56}$O$_6$NaP$_2$ (M+Na)$^+$ calcd 573.34443, found 545.34422.

Example 28: Dibutyl octane-1,8-diyl bis(vinylphosphonate)

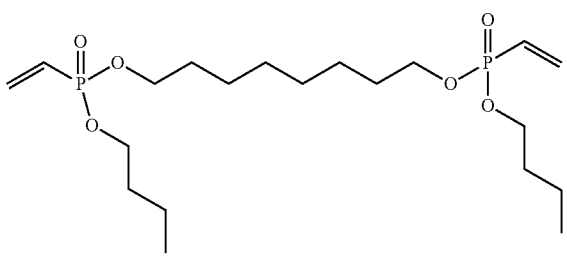 [SMILES: C=CP(=O)(OCCCC)OCCCCCCCCOP(=O)(C=C)OCCCC]

Dibutyl octane-1,8-diyl bis(vinylphosphonate) is prepared from compound in Example 1 (0.63 g, 3.84 mmol) and 1,8-dibromooctane (0.35 g, 1.28 mmol) using general method C in 71% (0.40 g, 0.91 mmol) overall yield in the form of colorless oil.

$^1$H NMR (400.1 MHz, CDCl$_3$): 0.93 (t, 6H, $J_{vic}$=8.0), 1.36-1.45 (m, 12H), 1.62-1.70 (m, 8H), 3.97-4.05 (m, 8H), 5.98-6.34 (m, 6H).

$^{13}$C NMR (100.6 MHz, CDCl$_3$): 13.46, 18.62, 25.31, 28.89, 30.30, 32.36 (d, $J_{C,P}$=6.0), 65.46, 65.66 (d, $J_{C,P}$=6.0), 125.80 (d, $J_{C,P}$=184.1), 135.24 (d, $J_{C,P}$=2.0).

$^1$P{$^1$H} NMR (162.0 MHz, CDCl$_3$): 19.79.

IR $v_{max}$ (KBr) 3091 (vw), 2963 (s), 2936 (s), 2875 (m), 2860 (m), 1614 (w), 1466 (m), 1459 (m), 1433 (w), 1400 (m), 1380 (w, sh), 1279 (m), 1241 (s), 1063 (s), 1021 9vs, br), 988 (vs), 852 (m), 606 (m).

HR-MS (ESI$^+$) For C$_{20}$H$_{40}$O$_6$NaP$_2$ (M+Na)$^+$ calcd 461.21923, found 461.21878.

Example 29: Decane-1,10-diyl dipentyl bis(vinylphosphonate)

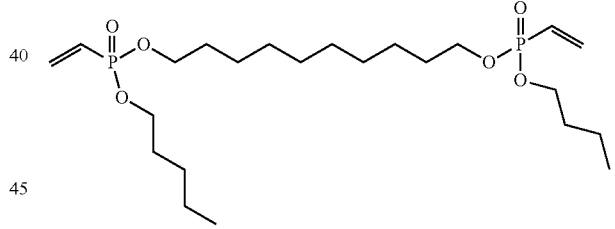

Decane-1,10-diyl dipentyl bis(vinylphosphonate) is prepared from compound in Example 1 (1.50 g, 9.14 mmol) and 1,10-dibromodecane (0.91 g, 3.05 mmol) using general method C in 62% (0.88 g, 1.89 mmol) overall yield in the form of colorless oil.

$^1$H NMR (400.1 MHz, CDCl$_3$): 0.92 (t, 6H, $J_{vic}$=8.0), 1.24-1.44 (m, 16H), 1.61-1.69 (m, 8H), 3.97-4.04 (m, 8H), 5.97-6.33 (m, 6H).

$^{13}$C NMR (100.6 MHz, CDCl$_3$: 13.59, 18.74, 25.50, 29.12, 29.40, 30.46, 32.47 (d, $J_{C,P}$=6.0), 65.60, 65.88 (d, $J_{C,P}$=6.0), 125.91 (d, $J_{C,P}$=184.1), 135.36 (d, $J_{C,P}$=2.0).

$^1$P{$^1$H} NMR (162.0 MHz, CDCl$_3$): 19.77.

IR $v_{max}$ (KBr) 3090 (vw), 3001 (vw), 2962 (s), 2935 (vs), 2850 (s), 1612 (w), 1463 (m), 1395 (m), 1271 (m, sh), 1250 (vs), 1068 (vs), 1025 (vs), 985 (vs), 980 (m, sh), 726 (m).

HR-MS (ESI$^+$) For C$_{22}$H$_{44}$O$_6$NaP$_2$ (M+Na)$^+$ calcd 489.25053, found 489.24997.

Example 30: Dibutyl dodecane-1,12-diyl bis(vinylphosphonate)

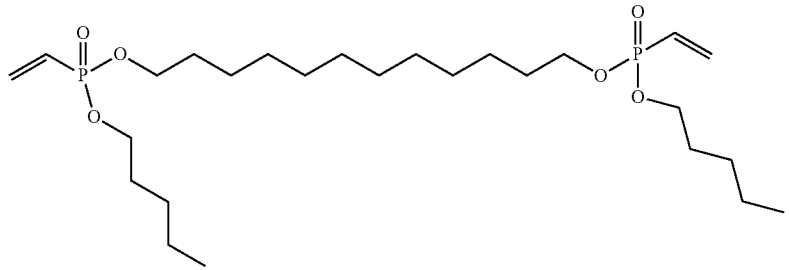 [SMILES: C=CP(=O)(OCCCCC)OCCCCCCCCCCCCOP(=O)(C=C)OCCCCC]

Dibutyl dodecane-1,12-diyl bis(vinylphosphonate) is prepared from compound in Example 1 (1.50 g, 9.14 mmol) and 1,12-dibromododecane (1.0 g, 3.05 mmol) using general method C in 65% (0.98 g, 1.98 mmol) overall yield in the form of colorless oil.

$^1$H NMR (400.1 MHz, CDCl$_3$): 0.92 (t, 6H, J$_{vic}$=8.0), 1.24-1.44 (m, 20H), 1.61-1.69 (m, 8H), 3.96-4.04 (m, 8H), 5.97-6.33 (m, 6H).

$^{13}$C NMR (100.6 MHz, CDCl$_3$): 13.72, 18.87, 25.64, 29.28, 29.61, 29.64, 30.60, 32.61 (d, J$_{C,P}$=7.0), 65.71, 66.03 (d, J$_{C,P}$=6.0), 126.05 (d, J$_{C,P}$=183.1), 135.45 (d, J$_{C,P}$=2.0).

$^1$P{$^1$H} NMR (162.0 MHz, CDCl$_3$): 19.74.

IR v$_{max}$ (KBr) 3086 (vw), 3007 (vw), 2959 (s), 2929 (vs), 2855 (s), 1613 (w), 1466 (m), 1397 (m), 1275 (m, sh), 1252 (vs), 1065 (vs), 1022 (vs), 985 (vs), 980 (m, sh), 721 (m).

HR-MS (ESI$^+$) For C$_{24}$H$_{49}$O$_6$P$_2$ (M+H)$^+$ calcd 495.29989, found 495.29965.

Example 31: Dibutyl tetradecane-1,14-diyl bis(vinylphosphonate)

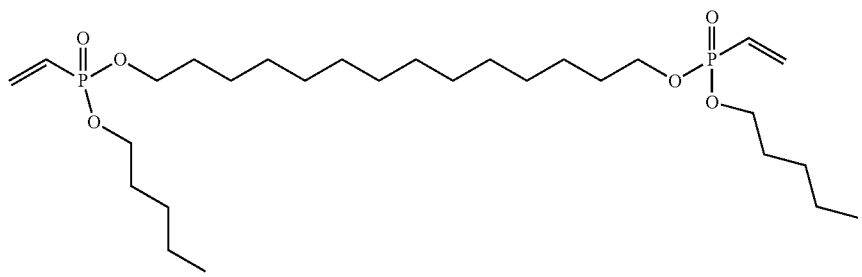 [SMILES: C=CP(=O)(OCCCCC)OCCCCCCCCCCCCCCOP(=O)(C=C)OCCCCC]

Dibutyl tetradecane-1,14-diyl bis(vinylphosphonate) is prepared from compound in Example 1 (1.50 g, 9.14 mmol) and 1,14-dibromododecane (1.09 g, 3.05 mmol) using general method C in 81% (1.29 g, 2.47 mmol) overall yield in the form of colorless oil.

$^1$H NMR (400.1 MHz, CDCl$_3$): 0.91 (t, 6H, J$_{vic}$=8.0), 1.23-1.43 (m, 24H), 1.60-1.68 (m, 8H), 3.96-4.04 (m, 8H), 5.96-6.33 (m, 6H).

$^{13}$C NMR (100.6 MHz, CDCl$_3$): 13.58, 18.73, 25.50, 29.15, 29.50, 29.55, 29.60, 30.45, 32.46 (d, J$_{C,P}$=6.0), 65.62, 65.95 (d, J$_{C,P}$=6.0), 125.85 (d, J$_{C,P}$=184.1), 135.40 (d, J$_{C,P}$=2.0).

$^1$P{$^1$} NMR (162.0 MHz, CDCl$_3$): 20.04.

IR v$_{max}$ (KBr) 3091 (w), 3015 (m), 2963 (m), 2931 (s), 2872 (m), 2856 (m), 1614 (w), 1467 (w, sh), 1466 (w), 1400 (m), 1277 (m, sh), 1240 (m), 1020 (s), 988 (s), 980 (m, sh), 857 (w), 606 (w).

HR-MS (ESI$^+$) For C$_{26}$H$_{52}$O$_6$NaP$_2$ (M+Na)$^+$ calcd 545.31313, found 545.31335.

Example 32: hexane-1,6-diyl di((Z)-non-3-en-1-yl) bis(vinylphosphonate)

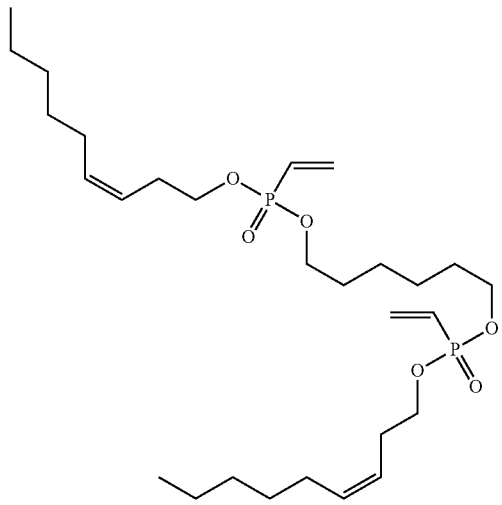 [SMILES: C=CP(=O)(OCC/C=C\CCCCC)OCCCCCCOP(=O)(C=C)OCC/C=C\CCCCC]

hexane-1,6-diyl dn(Z)-non-3-en-1-yl) bis(vinylphosphonate) is prepared from compound in Example 11 (2 g, 8.61 mmol) and 1,14-dibromhexane (0.74 g, 3.01 mmol) using general method C in 23% (1.1 g, 2 mmol) overall yield in the form of colorless oil.

$^1$H NMR (401 MHz, Chloroform-d) δ 0.91 (t, J=7.0 Hz, 6H); 1.24-1.47 (m, 16H); 1.64-1.77 (m, 4H); 2.01-2.09 (qd, J=7.3, 1.6 Hz, 4H); 2.34-2.56 (m, 4H); 4.03 (qd, J=6.9, 4.5 Hz, 8H); 5.30-5.59 (m, 4H); 5.98-6.41 (m, 6H).

$^{13}$C NMR (101 MHz, CDCl$_3$) δ 14.04; 22.54; 25.14; 27.32; 28.66 (d, J=6.4 Hz); 29.20; 30.34 (d, J=6.4 Hz); 31.46; 65.23 (d, J=5.8 Hz); 65.65 (d, J=5.8 Hz); 76.68; 77.00; 77.32; 123.67; 125.77 (d, J=184.1 Hz); 133.31; 135.58 (d, J=2.0 Hz).

$^1$P{$^1$H} NMR (162.0 MHz, CDCl$_3$): 20.09.

IR v$_{max}$ (CHCl$_3$) 3090 (vw), 2959 (s), 2931 (s), 2872 (m), 2859 (m), 1653 (vw), 1614 (w), 1468 (w), 1455 (w, sh), 1434 (vw), 1400 (w), 1380 (w), 1279 (w), 1240 (s), 1070 (m, sh), 1054 (s), 1004 (vs), 986 (s, sh).

HR-MS (ESI$^+$) For C$_{28}$H$_{53}$O$_6$P$_2$ (M+H)$^+$ vcalcd 547.33119, found 547.33133.

Example 33: Diisobutyl tetradecane-1,14-diyl bis(vinylphosphonate)

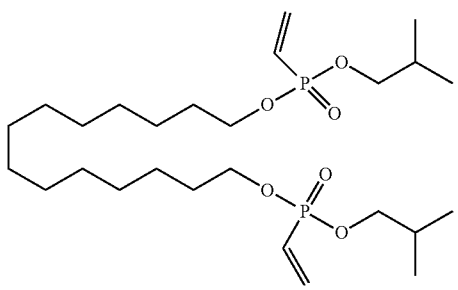 [SMILES: C=CP(=O)(OCCCCCCCCCCCCCCOP(=O)(C=C)OCC(C)C)OCC(C)C]

Diisobutyl tetradecane-1,14-diyl bis(vinylphosphonate) is prepared from the compound from Example 14 (527 mg, 3.21 mmol) and 1,14-dibromotetradecane, (381 mg, 1.07 mmol) using general method C in 89% (496 mg, 0.95 mmol) overall yield in the form of colorless oil.

$^1$H NMR (401 MHz, Chloroform-d) δ 6.38-5.96 (m, 6H), 4.08-3.96 (m, 4H), 3.77 (tt, J=6.7, 1.0 Hz, 4H), 1.94 (dp, J=13.3, 6.7 Hz, 2H), 1.66 (dt, J=8.2, 6.5 Hz, 4H), 1.44-1.20 (m, 20H), 0.94 (d, J=6.7 Hz, 12H).

$^{31}$P NMR (162 MHz, Chloroform-d) δ 19.95.

$^{13}$C NMR (101 MHz, Chloroform-d) δ 135.53, 125.97 (d, J=184.6 Hz), 71.92 (d, J=6.1 Hz), 66.09 (d, J=6.0 Hz), 30.62 (d, J=6.3 Hz), 29.76, 29.70, 29.65, 29.31 (d, J=7.3 Hz), 29.30, 25.66, 18.86.

IR v$_{max}$(CHCl$_3$) 3091 (vw), 2964 (s), 2929 (vs), 2875 (m), 2856 (s), 1614 (w), 1471 (m), —1458 (w, sh), 1400 (m), 1370 (w), 1279 (m), 1239 (s), —1048 (s, sh), 1012 (vs), —988 (s, sh).

HR-MS (ESI$^+$): For C$_{26}$H$_{53}$O$_6$P$_2$ (M+H)$^+$ m/z calculated 523.33119, found 523.33167±0.91003 ppm. For C$_{26}$H$_{52}$O$_6$NaP$_2$ (M+Na)$^+$ m/z calculated 545.31313, found 545.31342±0.51726 ppm.

Example 34: Diisobutyl dodecane-1,12-diyl bis(vinylphosphonate)

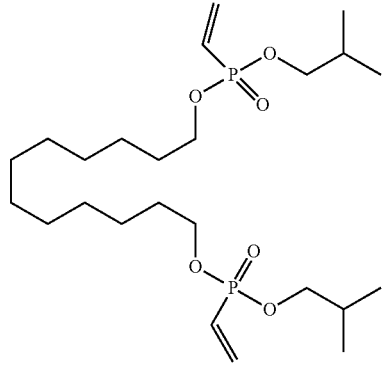 [SMILES: C=CP(=O)(OCCCCCCCCCCCCOP(=O)(C=C)OCC(C)C)OCC(C)C]

Diisobutyl dodecane-1,12-diyl bis(vinylphosphonate) is prepared from the compound from Example 14 (523 mg, 3.19 mg) and 1,12-dibromododecane, (98%, 356 4, 1.06 mmol) using general method C in 69% (360 mg, 0.73 mmol) overall yield in the form of colorless oil.

$^1$H NMR (401 MHz, Chloroform-d) δ 6.60-5.95 (m, 6H), 4.01 (q, J=6.9 Hz, 4H), 3.77 (td, J=6.6, 1.6 Hz, 4H), 1.94 (dt, J=13.3, 6.7 Hz, 2H), 1.65 (dt, J=8.1, 6.6 Hz, 4H), 1.47-1.21 (m, 16H), 0.94 (d, J=6.7 Hz, 12H).

$^{31}$P NMR (162 MHz, Chloroform-d) δ 19.95.

$^{13}$C NMR (101 MHz, Chloroform-d) δ 135.54, 125.96 (d, J=184.7 Hz), 71.92 (d, J=6.2 Hz), 66.08 (d, J=6.0 Hz), 30.61 (d, J=6.4 Hz), 29.66, 29.63, 29.30 (d, J=7.6 Hz), 29.30, 25.65, 18.88.

IR v$_{max}$(CHCl$_3$) 3090 (vw), 2964 (s), 2930 (vs), 2875 (m), 2856 (s), 1614 (w), 1471 (s), 1399 (s), 1370 (m), 1279 (m), 1240 (vs), 1167 (w), 1047 (vs, sh), 1012 (vs, vbr), ~988 (vs, sh), ~965 (s, sh), 862 (m).

HR-MS (ESI$^+$): For C$_{24}$H$_{48}$O$_6$NaP$_2$ (M+Na)$^+$ m/z calculated 517.28183, found 517.28131±1.00971 ppm.

Example 35: Hexan-1,8-diyl dihexyl bis((2-(bis(3-aminopropyl)amino)ethyl)phosphonate) hexahydrochloride

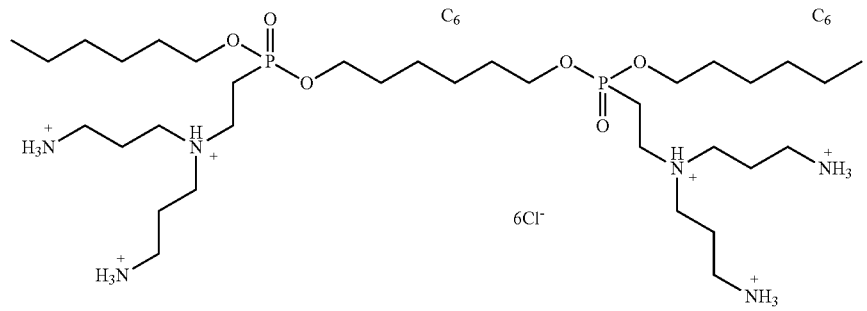

Hexan-1,8-diyl dihexyl bis((2-(bis(3-aminopropyl)amino)ethyl)phosphonate) hexahydrochloride is prepared from the compound from Example 3 using general methods C, D, and E, in ther form of white amorphous solide in 28% (0.41 g, 0.41 mmol) overall yield.

$^1$H NMR (500.2 MHz, CD$_3$OD): 0.90-0.95 (m, 6H, CH$_3$(CH$_2$)$_4$CH$_2$O); 1.32-1.52 (m, 16H, CH$_3$(CH$_2$)$_3$CH$_2$CH$_2$O, OCH$_2$CH$_2$(CH$_2$)$_2$CH$_2$CH$_2$O); 1.68-1.80 (m, 8H, CH$_3$(CH$_2$)$_3$ CH$_2$CH$_2$O, OCH$_2$CH$_2$(CH$_2$)$_2$CH$_2$CH$_2$O); 2.16-2.26 (m, 8H, NCH$_2$CH$_2$CH$_2$NH$_2$); 2.50-2.61 (m, 4H, PCH$_2$CH$_2$N); 3.11 (t, 8H, J$_{vic}$=7.5, NCH$_2$CH$_2$CH$_2$NH$_2$); 3.36-3.43 (m, 8H, NCH$_2$CH$_2$CH$_2$NH$_2$); 3.43-3.50 (m, 4H, PCH$_2$CH$_2$N); 4.09-4.21 (m, 8H, CH$_3$(CH$_2$)$_3$CH$_2$CH$_2$O, OCH$_2$CH$_2$(CH$_2$)$_2$CH$_2$CH$_2$O).

$^{13}$C NMR (125.8 MHz, CD$_3$OD): 14.37 (CH$_3$(CH$_2$)$_6$CH$_2$O); 21.33, 21.35 (d, J$_{C,P}$=140.8, PCH$_2$CH$_2$N); 23.26 (NCH$_2$CH$_2$CH$_2$NH$_2$); 23.81, 26.14, 26.15, 26.29 (CH$_3$(CH$_2$)$_3$CH$_2$CH$_2$O, OCH$_2$CH$_2$(CH$_2$)$_2$CH$_2$CH$_2$O); 31.37, 31.40, 31.55 (d, J$_{C,P}$=5.9, CH$_3$(CH$_2$)$_3$CH$_2$CH$_2$O, OCH$_2$(CH$_2$)$_2$CH$_2$CH$_2$O); 32.49 (CH$_3$(CH$_2$)$_3$CH$_2$CH$_2$O); 37.90 (NCH$_2$CH$_2$CH$_2$NH$_2$); 48.87 (PCH$_2$CH$_2$N); 51.07 (NCH$_2$CH$_2$CH$_2$NH$_2$); 68.05, 68.08, 68.25 (d, J$_{C,P}$=6.7, CH$_3$(CH$_2$)$_3$CH$_2$CH$_2$O, OCH$_2$CH$_2$(CH$_2$)$_2$CH$_2$CH$_2$O).

$^{31}$P{$^1$H} NMR (202.5 MHz, CD$_3$OD): 26.62.

IR v$_{max}$ (CHCl$_3$) 2957 (vs), 2933 (vs), 2860 (s), 2745 (s, br), 2640 (m, br), 2558 (m, br), 2051 (w, br), 1615 (m, br), 1513 (w, br), 1468 (m), 1397 (w, br), 1379 (w, sh), 1265 (m, sh), 1229 (m, br), 1060 (m), 1040 (m, sh), 998 (s).

HR-MS (ESI$^+$): For C$_{34}$H$_{80}$O$_6$P$_2$ (M+2H)$^{2+}$ z=2 m/z calcd 365.28018, found 365.28030.

Example 36: Hexan-1,8-diyl dioctyl bis((2-(bis(3-aminopropyl)amino)ethyl)phosphonate) hexahydrochloride

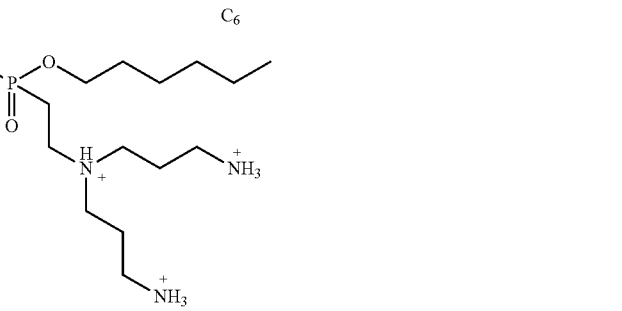

Hexan-1,8-diyl dioctyl bis((2-(bis(3-aminopropyl)amino)ethyl)phosphonate) hexahydrochloride is prepared for the compound from Example 5 using general methods C, D, and E, in their form of white amorphous solid in 28% (0.41 g, 0.41 mmol).

$^1$H NMR (500.0 MHz, CD$_3$OD): 0.88-0.93 (m, 6H, CH$_3$(CH$_2$)$_6$CH$_2$O); 1.26-1.52 (m, 24H, CH$_3$(CH$_2$)$_5$CH$_2$CH$_2$O, OCH$_2$CH$_2$(CH$_2$)$_2$CH$_2$CH$_2$O); 1.67-1.79 (m, 8H, CH$_3$(CH$_2$)$_5$ CH$_2$CH$_2$O, OCH$_2$CH$_2$(CH$_2$)$_2$CH$_2$CH$_2$O); 2.17-2.27 (m, 8H, NCH$_2$CH$_2$CH$_2$NH$_2$); 2.52-2.62 (m, 4H, PCH$_2$CH$_2$N); 3.11 (t, 8H, J$_{C,P}$=7.5, NCH$_2$CH$_2$CH$_2$NH$_2$); 3.36-3.45 (m, 8H, NCH$_2$CH$_2$CH$_2$NH$_2$); 3.42-3.51 (m, 4H, PCH$_2$CH$_2$N); 4.07-4.23 (m, 8H, CH$_3$(CH$_2$)$_5$CH$_2$CH$_2$O, OCH$_2$CH$_2$(CH$_2$)$_2$CH$_2$CH$_2$O).

$^{13}$C NMR (125.7 MHz, CD$_3$OD): 14.47 (CH$_3$(CH$_2$)$_6$CH$_2$O); 21.28, 21.31 (d, J$_{C,P}$=140.5, PCH$_2$CH$_2$N); 23.21 (NCH$_2$CH$_2$CH$_2$NH$_2$); 23.73, 26.14, 26.16, 26.63, 30.28, 30.37 (CH$_3$(CH$_2$)$_5$CH$_2$CH$_2$O, OCH$_2$CH$_2$(CH$_2$)$_2$CH$_2$CH$_2$O); 31.36, 31.40, 31.60 (d, J$_{C,P}$=6.0, CH$_3$(CH$_2$)$_5$CH$_2$CH$_2$O, OCH$_2$CH$_2$(CH$_2$)$_2$CH$_2$CH$_2$O); 32.99 (CH$_3$(CH$_2$)$_5$ CH$_2$CH$_2$O); 37.86 (NCH$_2$CH$_2$CH$_2$NH$_2$); 48.83 (PCH$_2$CH$_2$N); 50.98 (NCH$_2$CH$_2$CH$_2$NH$_2$); 68.01, 68.03, 68.22 (d, $_{C,P}$=6.6, CH$_3$(CH$_2$)$_5$CH$_2$CH$_2$O, OCH$_2$CH$_2$(CH$_2$)$_2$CH$_2$CH$_2$O).

$^{31}$P{$^1$H} NMR (202.4 MHz, CD$_3$OD): 27.32.

HR-MS (ESI$^+$): For C$_{38}$H$_{88}$N$_6$O$_6$P$_2$ (M+2H)$^{2+}$ z=2 m/z calcd 393.31148, found 393.31156.

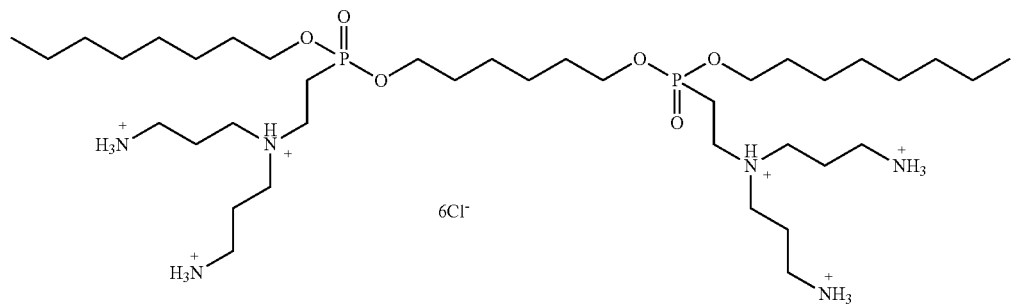

Example 37: Octane-1,8-diyl dipentyl bis((2-(bis(3-aminopropyl)amino)-ethyl)phosphonate) hexahydrochloride

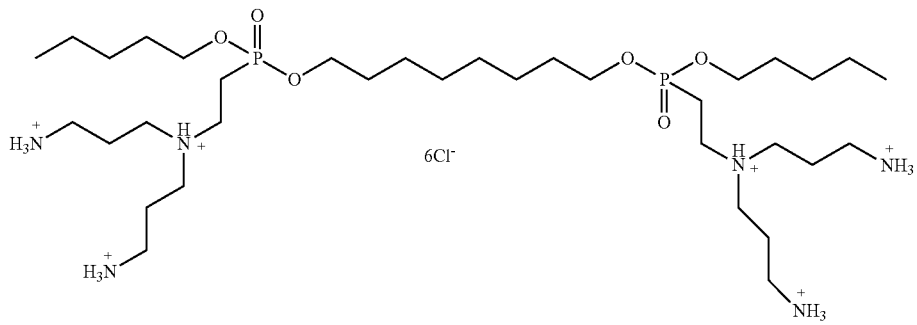

Octane-1,8-diyl dipentyl bis((2-(bis(3-aminopropyl)amino)ethyl)phosphonate) hexahydrochloride is prepared from compound in Example 24 (0.50 g, 1.0 mmol) using general methods D and E, in the form of a white amorphous solid in overall yield 53% (0.54 g, 0.57 mmol).

$^1$H NMR (400.1 MHz, CD$_3$OD): 0.92-0.96 (m, 6H), 1.36-1.44 (m, 16H), 1.69-1.76 (m, 8H), 2.17-2.25 (m, 8H), 2.49-2.59 (m, 4H), 3.11 (t, 8H, J$_{vic}$=8.0), 3.37-3.42 (m, 8H), 3.44-3.48 (m, 4H), 4.11-4.16 (m, 8H).

$^{13}$C NMR (100.6 MHz, CD$_3$OD): 14.34, 21.28 (d, = 139.8), 23.29, 26.54, 28.79, 30.15, 30.16, 31.29, 31.56 (d, J$_{C,P}$=6.0), 37.89, 48.84, 51.07, 68.22 (d, J$_{C,P}$=7.0).

$^{31}$P{$^1$H} NMR (162.0 MHz, CD$_3$OD): 28.40.

IR v$_{max}$ (KBr) 2933 (s), 2634 (s), 2558 (m), 1600 (m), 1467 (m), 1224 (m), 1173 (m, sh), 1070 (m, sh), 1047 (s), 997 (s).

HR-MS (ESI$^+$): For C$_{34}$H$_{79}$N$_6$O$_6$P$_2$ (M+H)$^+$ calcd 729.55290, found 729.55308.

Example 38: Dihexyl octane-1,8-diyl bis((2-(bis(3-aminopropyl)amino)ethyl)-phosphonate) hexahydrochloride

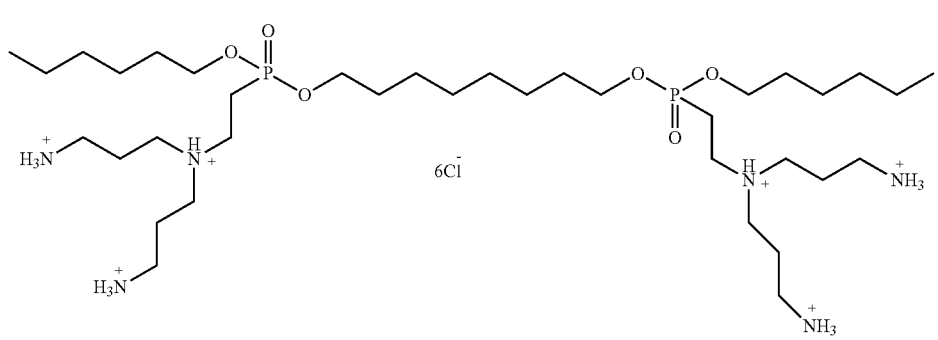

Dihexyl octane-1,8-diyl bis((2-(bis(3-aminopropyl)amino)ethyl)phosphonate) hexahydrochloride is prepared from compound in Example 21 (0.78 g, 1.58 mmol) using general methods D and E, in the form of a white amorphous solid in overall yield 57% (0.88 g, 0.90 mmol).

$^1$H NMR (400.1 MHz, CD$_3$OD): 0.90-0.94 (m, 6H), 1.33-1.46 (m, 20H), 1.69-1.77 (m, 8H), 2.17-2.25 (m, 8H), 2.48-2.58 (m, 4H), 3.11 (t, 8H, J$_{vic}$=8.0), 3.34-3.41 (m, 8H), 3.43-3.49 (m, 4H), 4.11-4.16 (m, 8H).

$^{13}$C NMR (100.6 MHz, CD$_3$OD): 12.98, 19.90 (d, J$_{C,P}$=140.8), 21.89, 22.23, 24.90, 25.16, 28.78, 31.10, 30.17 (d, J$_{C,P}$=6.0), 36.49, 47.42, 49.68, 66.80, 66.86 (d, J$_{C,P}$=7.0, 6.0).

$^{31}$P{$^1$H} NMR (162.0 MHz, CD$_3$OD): 28.42.

IR v$_{max}$ (KBr) 2966 (m), 2931 (m), 2872 (m), 2623 (w), 2553 (w), 1470 (m), 1384 (w), 1236 (w), 1050 (m), 1000 (m).

HR-MS (ESI$^+$): For C$_{36}$H$_{84}$N$_6$O$_6$P$_2$ (M+2H)$^{2+}$ calcd 379.29583, found 379.29553.

Example 39: Decane-1,10-diyl diisobutyl bis(vinylphosphonate)

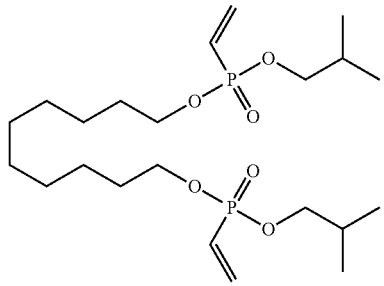 [SMILES: C=CP(=O)(OCCCCCCCCCCOP(=O)(C=C)OCC(C)C)OCC(C)C]

Decane-1,10-diyl diisobutyl bis(vinylphosphonate) is prepared from the compound from Example 14 (500 mg, 3.05 mmol) and 1,10-dibromodecane (97%, 314 μL 1.01 mmol) using general method C in 88% (416 mg, 0.89 mmol) overall yield in the form of colorless oil.

$^1$H NMR (401 MHz, Chloroform-d) δ 6.37-5.94 (m, 6H), 4.01 (q, J=6.8 Hz, 4H), 3.77 (td, J=6.6, 1.6 Hz, 4H), 1.94 (dp, J=13.4, 6.7 Hz, 2H), 1.72-1.61 (m, 4H), 1.42-1.21 (m, 12H), 0.93 (d, J=6.7 Hz, 12H).

$^{31}$P NMR (162 MHz, Chloroform-d) δ 19.92.

$^{13}$C NMR (101 MHz, Chloroform-d) δ 135.56 (d, J=2.0 Hz), 125.94 (d, J=184.4 Hz), 71.92 (d, J=6.0 Hz), 66.04 (d, J=5.9 Hz), 30.60 (d, J=6.3 Hz), 29.54, 29.33, 29.25, 25.63, 18.86 (d, J=1.9 Hz).

IR $v_{max}$(CHCl$_3$) 3091 (vw), 2964 (s), 2932 (vs), 2875 (m), 2857 (s), 1614 (w), 1471 (s), 1399 (s), 1370 (m), 1278 (s), 1240 (vs), 1167 (w), ~1047 (s, sh), 1013 (vs, br), ~990 (vs, sh), ~965 (s, sh), 862 (m).

HR-MS (ESI$^+$): For C$_{22}$H$_{44}$O$_6$NaP$_2$ (M+Na)$^+$ m/z calculated 489.25053, found 489.25012±0.83547 ppm.

Example 40: Diisobutyl decane-1,10-diyl bis((2-(bis(3-aminopropyl)amino)ethyl)-phosphonate) hexahydrochloride

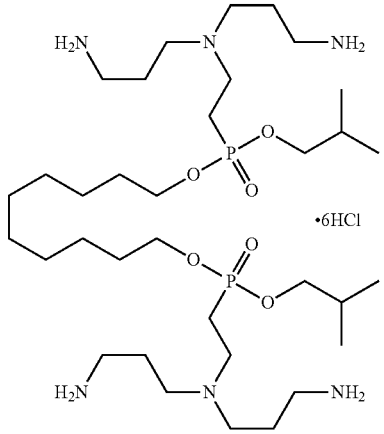 [SMILES: CC(C)COP(=O)(CCN(CCCN)CCCN)OCCCCCCCCCCOP(=O)(CCN(CCCN)CCCN)OCC(C)C]

Diisobutyl decane-1,10-diyl bis((2-(bis(3-aminopropyl)amino)ethyl)phosphonate) hexahydrochloride is prepared from the compound from Example 38 (416 mg, 0.89 mmol) using general methods D and E in 31% (258 mg, 0.28 mmol) overall yield in the form of white amorphous powder.

$^1$H NMR (401 MHz, Methanol-d$_4$) δ 4.14 (q, J=6.7 Hz, 4H), 3.90 (tt, J=6.1, 3.2 Hz, 4H), 3.51-3.43 (m, 4H), 3.43-3.35 (m, 8H), 3.11 (t, J=7.5 Hz, 8H), 2.74-2.47 (m, 4H), 2.21 (h, J=6.4 Hz, 8H), 1.98 (dt, J=13.3, 6.6 Hz, 2H), 1.83-1.65 (m, 4H), 1.53-1.27 (m, 12H), 0.99 (d, J=6.7 Hz, 12H).

$^{31}$P NMR (162 MHz, Methanol-d$_4$) δ 28.59.

$^{13}$C NMR (101 MHz, Methanol-d$_4$) δ 73.92 (d, J=7.1 Hz), 68.29 (d, J=6.7 Hz), 51.09, 37.86, 31.63 (d, J=5.9 Hz), 30.65, 30.47 (d, J=6.4 Hz), 30.30, 26.63, 23.33, 21.86, 20.47, 19.02.

IR $v_{max}$ (KBr tab. 1 mm) 2961 (s), 2929 (s), 2855 (m), 3200-2700 (vs, vbr), 2700-2500 (m, vbr), 1610 (m), 1513 (m), 1468 (s), 1401 (m), 1369 (m), 1227 (vs), 1005 (vs), —869 (m, sh), 851 (m), 767 (m), 725 (w).

HR-MS (ESI$^+$): For C$_{34}$H$_{79}$O$_6$N$_6$P$_2$ (M+H)$^+$ m/z calculated 729.55308, found 729.55268±0.54965 ppm.

Example 41: Dibutyl decane-1,10-diyl bis((2-(bis(3-aminopropyl)amino)ethyl)phosphonate) hexahydrochloride

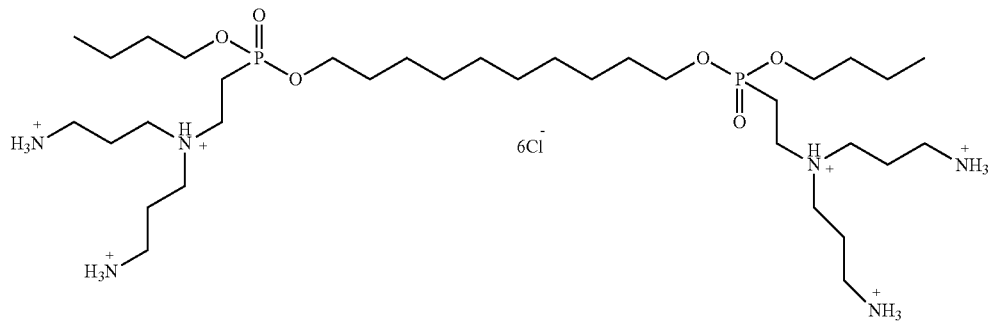

Dibutyl decane-1,10-diyl bis((2-(bis(3-aminopropyl)amino)ethyl)phosphonate) hexahydrochloride is prepared from compound in Example 28 (0.65, 0.54 mmol) using general methods D and E, in the form of a white amorphous solid in 55% overall yield (0.88 g, 0.90 mmol).

$^1$H NMR (400.1 MHz, CD$_3$OD): 0.96-0.99 (m, 6H), 1.35-1.50 (m, 16H), 1.67-1.76 (m, 8H), 2.17-2.25 (m, 8H), 2.48-2.58 (m, 4H), 3.10 (t, 8H, J$_{vic}$=8.0), 3.35-3.41 (m, 8H), 3.42-3.48 (m, 4H), 4.11-4.17 (m, 8H).

$^{13}$C NMR (100.6 MHz, CD$_3$OD): 13.96, 19.79, 21.27 (d, J$_{C,P}$=149.8), 23.25, 26.60, 30.26, 30.59, 31.59, 33.60 (d, J$_{C,P}$=6.0), 37.87, 48.85, 51.06, 67.91, 68.24 (d, J$_{C,P}$=6.0).

$^{31}$P{$^1$H} NMR (162.0 MHz, CD$_3$OD): 28.42.

IR $v_{max}$ (KBr) 2932 (vs), 2632 (m), 2558 (m), 1598 (m), 1467 (m), 1224 (m), 1172 (m sh), 1070 (m, sh), 1063 (m), 1018 (vs), 997 (m, sh).

HR-MS (ESI$^+$): For C$_{34}$H$_{79}$N$_6$O$_6$P$_2$ (M+H)$^+$ calcd 729.55255, found 729.55308.

Example 42: Decane-1,10-diyl dipentyl bis((2-(bis(3-aminopropyl)amino)-ethyl)phosphonate) hexahydrochloride

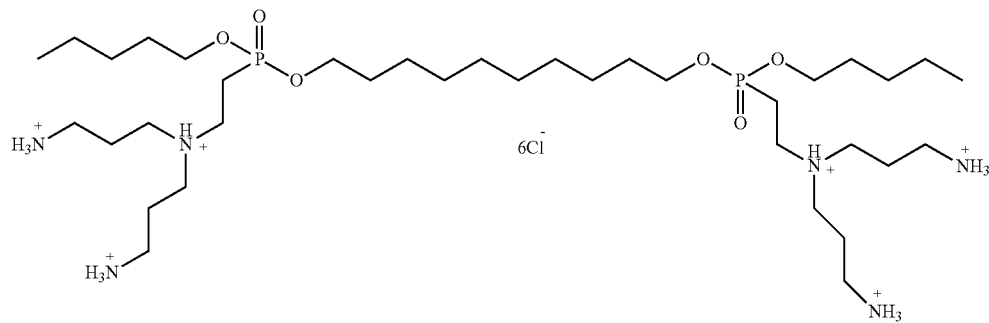

Decane-1,10-diyl dipentyl bis((2-(bis(3-aminopropyl)amino)ethyl)phosphonate) hexahydrochloride is prepared from compound in Example 25 (0.83, 1.67 mmol) using general methods D and E, in the form of a white amorphous solid in 45% overall yield (0.73 g, 0.75 mmol).

$^1$H NMR (400.1 MHz, CD$_3$OD): 0.93-0.96 (m, 6H), 1.34-1.44 (m, 20H), 1.69-1.76 (m, 8H), 2.17-2.25 (m, 8H), 2.48-2.58 (m, 4H), 3.10 (t, 8H, J$_{vic}$=8.0), 3.37-3.41 (m, 8H), 3.44-3.49 (m, 4H), 4.11-4.16 (m, 8H).

$^{13}$C NMR (100.6 MHz, CD$_3$OD): 14.35, 21.25 (d, J$_{C,P}$=140.8), 23.27, 23.30, 26.62, 28.80, 30.29, 30.63, 31.29, 31.61 (d, J$_{C,P}$=6.0), 37.87, 48.83, 51.07, 68.20, 68.27 (d, J$_{C,P}$=2.0, 3.0).

$^{31}$P{$^1$H} NMR (162.0 MHz, CD$_3$OD): 28.41.

IR $v_{max}$ (KBr) 2929 (s), 2831 (m, sh), 2677-2543 (m), 1611 (m), 1514 (m), 1467 (m), 1390 (m), 1263 (m), 1228 (s), 1077-991 (s).

HR-MS (ESI$^+$: For C$_{36}$H$_{83}$N$_6$O$_6$P$_2$ (M+H)$^+$ calcd 757.58403, found 729.58438.

Example 43: Decane-1,10-diyl dihexyl bis((2-(bis(3-aminopropyl)amino)-ethyl)phosphonate) tetrahydrochloride

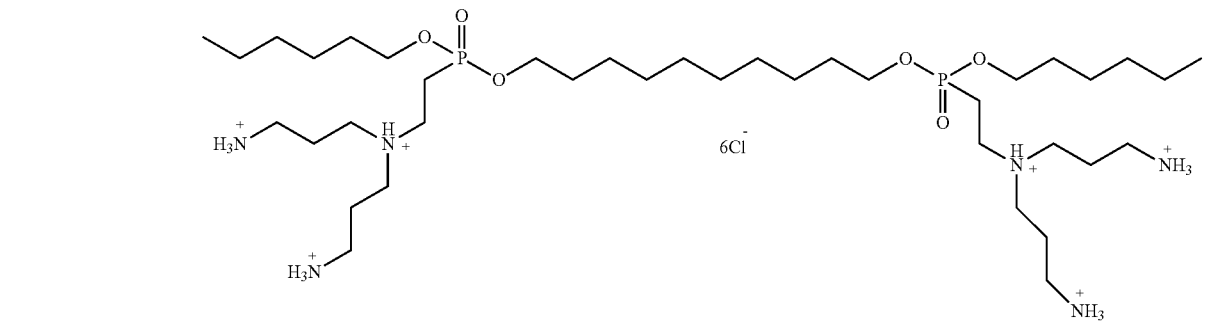

Decane-1,10-diyl dihexyl bis((2-(bis(3-aminopropyl) amino)ethyl)phosphonate) tetrahydrochloride is prepared from compound in Example 22 (0.65, 1.24 mmol) using general methods D and E, in the form of a white amorphous solid in 61% overall yield (0.70 g, 0.76 mmol).

$^1$H NMR (400.1 MHz, CD$_3$OD): 0.91-0.94 (m, 6H), 1.33-1.46 (m, 24H), 1.67-1.76 (m, 8H), 2.16-2.24 (m, 8H), 2.47-2.57 (m, 4H), 3.10 (t, 8H, J$_{vic}$=8.0), 3.35-3.40 (m, 8H), 3.42-3.48 (m, 4H), 4.10-4.16 (m, 8H).

$^{13}$C NMR (100.6 MHz, CD$_3$OD): 12.98, 19.80 (d, J$_{C,P}$=140.8), 21.91, 22.23, 24.91, 25.24, 28.91, 29.26, 30.02 (d, J$_{C,P}$=6.0, 5.0), 31.11, 36.48, 47.64, 49.68, 66.85 (d, J$_{C,P}$=7.0)

$^{31}$P{$^1$H} NMR (162.0 MHz, CD$_3$OD): 28.45.

IR v$_{max}$ (KBr) 2974 (m), 2927 (w), 2895 (w), 2635 (w), 2510 (w), 1601 (w, sh), 1383 (w), 1273 (w), 1089 (m), 1050 (m).

HR-MS (ESI$^+$): For C$_{38}$H$_{87}$N$_6$O$_6$P2 (M+H)$^+$ calcd 785.61568, found 785.61479.

Example 44: Decan-1,10-diyl dioketyl bis((2-(bis(3-aminopropyl)amino)ethyl)-phosphonate) tetrahydrochloride

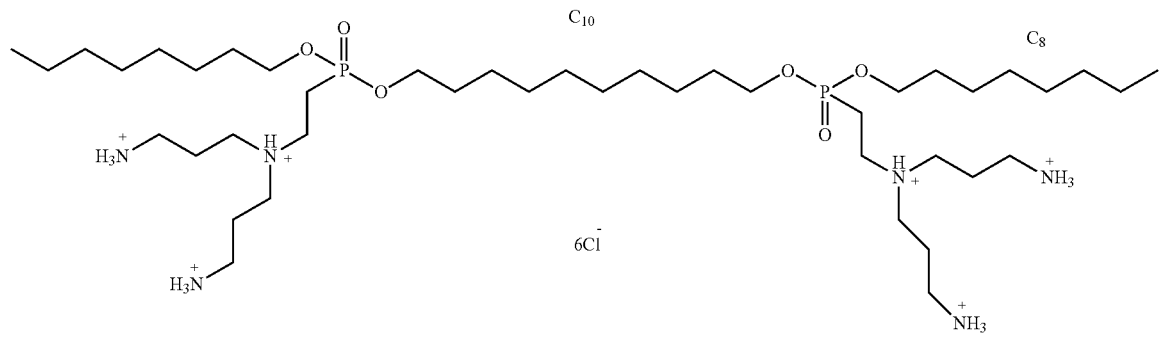

Decan-1,10-diyl dioktyl bis((2-(bis(3-aminopropyl) amino)ethyl)-phosphonate) tetrahydrochloride se is prepared from the compound from Example 5 using general methods C, D, and E, in the form of a white amorphous solid in overall yield 32% (1.18 g, 1.12 mmol).

$^1$H NMR (500.2 MHz, CD$_3$OD): 0.88-0.93 (m, 6H, CH$_3$(CH$_2$)$_6$CH$_2$O); 1.26-0 1.46 (m, 32H, CH$_3$(CH$_2$)$_5$CH$_2$CH$_2$O, OCH$_2$CH$_2$(CH$_2$)$_6$CH$_2$CH$_2$O); 1.68-1.76 (m, 8H, CH$_3$(CH$_2$)$_5$ CH$_2$CH$_2$O, OCH$_2$CH$_2$(CH$_2$)$_6$CH$_2$CH$_2$O); 2.17-2.26 (m, 8H, NCH$_2$CH$_2$CH$_2$NH$_2$); 2.49-2.59 (m, 4H, PCH$_2$CH$_2$N); 3.11 (t, 8H, J$_{vic}$=7.5, NCH$_2$CH$_2$CH$_2$NH$_2$); 3.36-3.43 (m, 8H, NCH$_2$CH$_2$CH$_2$NH$_2$); 3.43-3.49 (m, 4H, PCH$_2$CH$_2$N); 4.10-4.16 (m, 8H, CH$_3$(CH$_2$)$_5$CH$_2$CH$_2$O, OCH$_2$CH$_2$(CH$_2$)$_6$ CH$_2$CH$_2$O).

$^{13}$C NMR (125.8 MHz, CD$_3$OD): 14.45 (CH$_3$(CH$_2$)$_6$ CH$_2$O); 21.28 (d, J$_{C,P}$=140.2, PCH$_2$CH$_2$N); 23.22 (NCH$_2$CH$_2$CH$_2$NH$_2$); 23.69, 26.62, 26.64, 30.24, 30.29, 30.34, 30.62 (CH$_3$(CH$_2$)$_5$CH$_2$CH$_2$O, OCH$_2$CH$_2$(CH$_2$)$_6$ CH$_2$CH$_2$O); 31.58, 31.59 (d, J$_{C,P}$=5.8, CH$_3$(CH$_2$)$_5$ CH$_2$CH$_2$O, OCH$_2$CH$_2$(CH$_2$)$_6$CH$_2$CH$_2$O); 32.96 (CH$_3$(CH$_2$)$_5$ CH$_2$CH$_2$O); 37.88 (NCH$_2$CH$_2$CH$_2$NH$_2$); 48.85 (PCH$_2$CH$_2$N); 51.04 (NCH$_2$CH$_2$CH$_2$NH$_2$); 68.23 (d, J$_{C,P}$=6.7, CH$_3$(CH$_2$)$_5$CH$_2$CH$_2$O, OCH$_2$CH$_2$(CH$_2$)$_6$ CH$_2$CH$_2$O).

$^{31}$P{$^1$H} NMR (202.5 MHz, CD$_3$OD): 26.64.

HR-MS (ESI$^+$) For C$_{42}$H$_{96}$N$_6$OI$_6$P$_2$ (M+2H)$^{2+}$ calcd 421.34278, found 421.34273.

Example 45: Decan-1,10-diyl didecyl bis((2-(bis(3-aminopropyl)amino)ethyl)-phosphonate) tetrahydrochloride

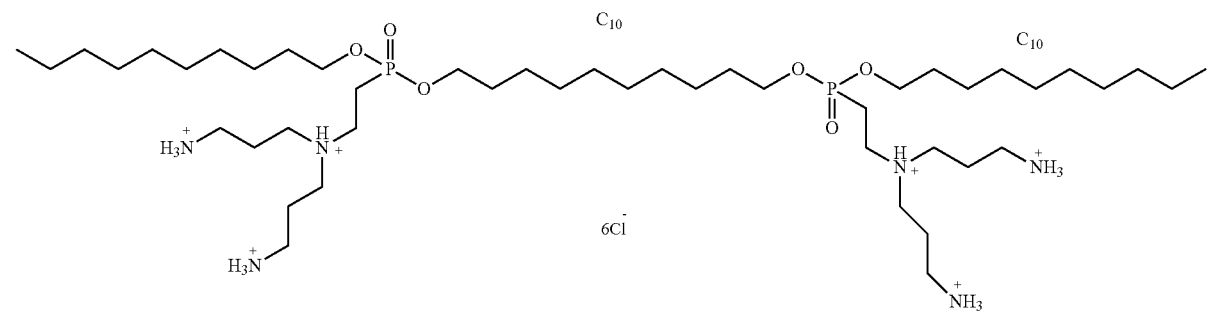

Decan-1,10-diyl didecyl bis((2-(bis(3-aminopropyl)amino)ethyl)-phosphonate) tetrahydrochloride is prepared from the compound from Example 6 using general methods C, D, and E, in the form of a white amorphous solid in overall yield 46% (0.41 g, 0.41 mmol).

$^1$H NMR (500.2 MHz, CD$_3$OD): 0.88-0.93 (m, 6H, CH$_3$(CH$_2$)$_8$CH$_2$O); 1.25-1.46 (m, 40H, CH$_3$(CH$_2$)$_7$CH$_2$CH$_2$O, OCH$_2$CH$_2$(CH$_2$)$_6$CH$_2$CH$_2$O); 1.68-1.76 (m, 8H, CH$_3$(CH$_2$)$_7$ CH$_2$CH$_2$O, OCH$_2$CH$_2$(CH$_2$)$_6$CH$_2$CH$_2$O); 2.16-2.25 (m, 8H, NCH$_2$CH$_2$CH$_2$NH$_2$); 2.49-2.58 (m, 4H, PCH$_2$CH$_2$N); 3.11 (t, 8H, J$_{vic}$=7.5, NCH$_2$CH$_2$CH$_2$NH$_2$); 3.36-3.42 (m, 8H, NCH$_2$CH$_2$CH$_2$NH$_2$); 3.42-3.49 (m, 4H, PCH$_2$CH$_2$N); 4.10-4.16 (m, 8H, CH$_3$(CH$_2$)$_7$CH$_2$CH$_2$O, OCH$_2$CH$_2$(CH$_2$)$_6$ CH$_2$CH$_2$O).

$^{13}$C NMR (125.8 MHz, CD$_3$OD): 14.46 (CH$_3$(CH$_2$)$_8$ CH$_2$O); 21.26 (d, J$_{C,P}$=140.3, PCH$_2$CH$_2$N); 23.26 (NCH$_2$CH$_2$CH$_2$NH$_2$); 23.72, 26.62, 26.64, 30.29, 30.31, 30.45, 30.66, 30.69 (CH$_3$(CH$_2$)$_7$CH$_2$CH$_2$O, OCH$_2$CH$_2$(CH$_2$)$_6$CH$_2$CH$_2$O); 31.59, 31.62 (d, J$_{C,P}$=5.8, CH$_3$(CH$_2$)$_7$ CH$_2$CH$_2$O, OCH$_2$CH$_2$(CH$_2$)$_6$CH$_2$CH$_2$O); 33.05 (CH$_3$ (CH$_2$)$_7$ CH$_2$CH$_2$O); 37.87 (NCH$_2$CH$_2$CH$_2$NH$_2$); 48.83 (PCH$_2$CH$_2$N); 51.06 (NCH$_2$CH$_2$CH$_2$NH$_2$); 68.24 (d, J$_{C,P}$=6.6, CH$_3$(CH$_2$)$_7$CH$_2$CH$_2$O, OCH$_2$CH$_2$(CH$_2$)$_6$ CH$_2$CH$_2$O).

$^{31}$P{$^1$H} NMR (202.5 MHz, CD$_3$OD): 26.65.

IR $v_{max}$ (KBr) 2956 (vs), 2925 (vs), 2854 (vs), 2675 (m, br), 2620 (m, br), 2546 (s, br), 2059 (w, br), 1628 (m, sh), 1607 (m), 1542 (m), 1510 (m), 1484 (m), 1468 (m), 1456 (m, sh), 1401 (w), 1390 (w), 1377 (w, sh), 1338 (vw), 1305 (w), 1227 (s), 1075 (m), 1022 (s, sh), 992 (s), 722 (w).

HR-MS (ESI$^+$) For C$_{46}$H$_{104}$N$_6$O$_6$P$_2$ (M+2H)$^{2+}$ calcd 449.37408, found 449.37398.

Example 46: Dodecane-1,12-diyl diisobutyl bis((2-(bis(3-aminopropyl)amino)ethyl)-phosphonate) hexahydrochloride

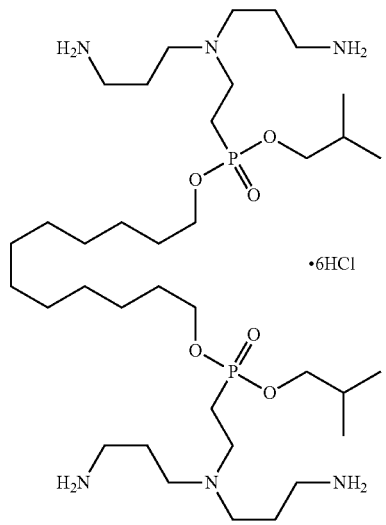 [SMILES: CC(C)COP(=O)(CCN(CCCN)CCCN)OCCCCCCCCCCCCOP(=O)(CCN(CCCN)CCCN)OCC(C)C]

Dodecane-1,12-diyl diisobutyl bis((2-(bis(3-aminopropyl)amino)ethyl)phosphonate) hexahydrochloride is prepared from the compound from Example 33 (360 mg, 0.728 mmol) using general methods D and E in 6% (43 mg, 43.6 μmol) overall yield in the form of white amorphous powder.

$^1$H NMR (401 MHz, Methanol-d$_4$) δ 4.15 (dt, J=7.8, 6.6 Hz, 4H), 3.92 (td, J=6.6, 2.4 Hz, 4H), 3.55-3.42 (m, 4H), 3.43-3.34 (m, 8H), 3.11 (t, J=7.5 Hz, 8H), 2.67-2.46 (m, 4H), 2.33-2.15 (m, 8H), 1.99 (dp, J=13.3, 6.7 Hz, 2H), 1.86-1.65 (m, 4H), 1.53-1.28 (m, 16H), 1.00 (d, J=6.7 Hz, 12H).

$^{31}$P NMR (162 MHz, Methanol-d$_4$) δ 27.12.

$^{13}$C NMR (101 MHz, Methanol-d$_4$) δ 73.92 (d, J=6.6 Hz), 68.29 (d, J=6.7 Hz), 51.09, 37.87, 31.63 (d, J=5.5 Hz), 30.74, 30.71, 30.47 (d, J=6.4 Hz), 30.32, 26.62, 23.32, 21.88, 20.49, 19.03.

IR $v_{max}$(KBr tab. 1 mm) 3200-2700 (vs, vbr), 2961 (s), 2927 (s), 2854 (m), 2700-2500 (m), 1607 (m), 1510 (w), 1470 (m), 1400 (w), 1369 (w), 1226 (m), 1002 (s), ~869 (w, sh), 851 (m), 768 (w), 724 (vw).

HR-MS (ESI$^+$): For C$_{36}$H$_{83}$O$_6$N$_6$P$_2$ (M+H)$^+$ m/z calculated 757.58438, found 757.58375±0.83066 ppm.

Example 47: Dibutyl dodecane-1,12-diyl bis((2-(bis(3-aminopropyl)amino)ethyl)-phosphonate) hexahydrochloride

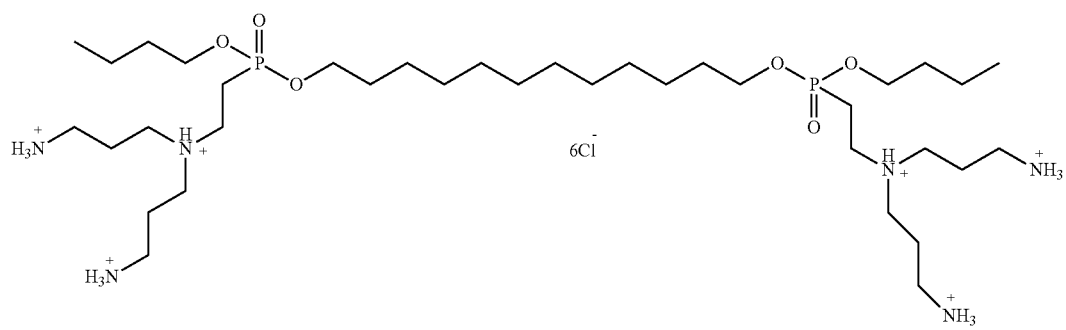

Dibutyl dodecane-1,12-diyl bis((2-(bis(3-aminopropyl)amino)ethyl)phosphonate) hexahydrochloride is prepared from compound in Example 29 (0.97, 1.96 mmol) using general methods D and E, in the form of a white amorphous solid in overall yield 48% (0.73 g, 0.75 mmol).

$^1$H NMR (400.1 MHz, CD$_3$OD): 0.95-0.99 (m, 6H), 1.32-1.50 (m, 20H), 1.64-1.76 (m, 8H), 2.16-2.24 (m, 8H), 2.47-2.57 (m, 4H), 3.10 (t, 8H, J$_{vic}$=8.0), 3.35-3.40 (m, 8H), 3.44-3.46 (m, 4H), 4.10-4.17 (m, 8H).

$^{13}$C NMR (100.6 MHz, CD$_3$OD): 13.96, 19.79, 21.27 (d, J$_{C,P}$=140.8), 23.24, 26.60, 30.26, 30.59, 31.59, 33.60 (d, J$_{C,P}$=6.0), 37.87, 48.84, 51.05, 67.90, 68.24 (d, J$_{C,P}$=6.0, 7.0)

$^{31}$P{$^1$H} NMR (162.0 MHz, CD$_3$OD): 28.43.

IR v$_{max}$ (KBr) 2930 (s), 2780 (m), 2630 (m), 2557 (m), 1597 (m), 1467 (m), 1226 (m), 1168 (m, sh), 1070 (m, sh), 1064 (m), 1020 (s), 1004 (s), HR-MS (ESI$^+$) For C$_{34}$H$_{79}$N$_6$O$_6$P$_2$ (M+H)$^+$ calcd 729.55308, found 729.55300.

Example 48: Dodecane-1,12-diyl dipentyl bis((2-(bis(3-aminopropyl)amino)ethyl)-phosphonate) hexahydrochloride

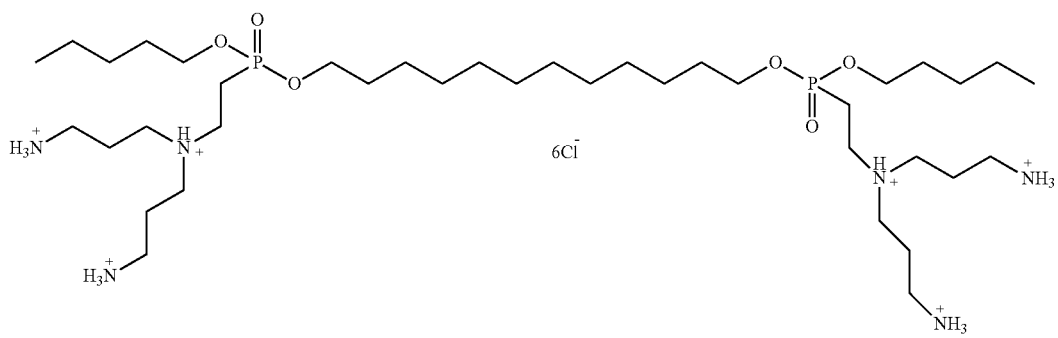

Dodecane-1,12-diyl dipentyl bis((2-(bis(3-aminopropyl)amino)ethyl)phosphonate) hexahydrochloride is prepared from compound in Example 26 (1.10 g, 2.10 mmol) using general methods D and E, in the form of a white amorphous solid in overall yield 58% (0.78 g, 0.84 mmol).

$^1$H NMR (400.1 MHz, CD$_3$OD): 0.93-0.96 (m, 6H), 1.34-1.44 (m, 24H), 1.69-1.76 (m, 8H), 2.17-2.25 (m, 8H), 2.49-2.59 (m, 4H), 3.11 (t, 8H, J$_{vic}$=8.0), 3.34-3.43 (m, 8H), 3.45-3.49 (m, 4H), 4.10-4.16 (m, 8H).

$^{13}$C NMR (100.6 MHz, CD$_3$OD): 14.35, 21.27 (d, J$_{C,P}$=139.8), 23.24, 23.29, 26.62, 28.79, 30.30, 30.68, 30.71, 31.29, 31.60 (d, J$_{C,P}$=5.0, 6.0) 37.87, 48.86, 51.05, 68.20, 68.26 (d, J$_{C,P}$=3.0, 4.0).

$^{31}$P{$^1$H} NMR (162.0 MHz, CD$_3$OD): 28.38.

IR v$_{max}$ (KBr) 2930 (vs), 2631 (m, sh), 2557 (m, sh), 1599 (m), 1467 (m), 1226 (s), 1170 (m, sh), 1065 (m, sh), 1052 (s, sh), 995 (s).

HR-MS (ESI$^+$) For C$_{38}$H$_{88}$N$_6$O$_6$P$_2$ (M+2H)$^{2+}$ calcd 393.31141, found 393.31148.

Example 49: Dodecan-1,10-diyl dioctyl bis((2-(bis(3-aminopropyl)amino)ethyl)-phosphonate) tetrahydrochloride

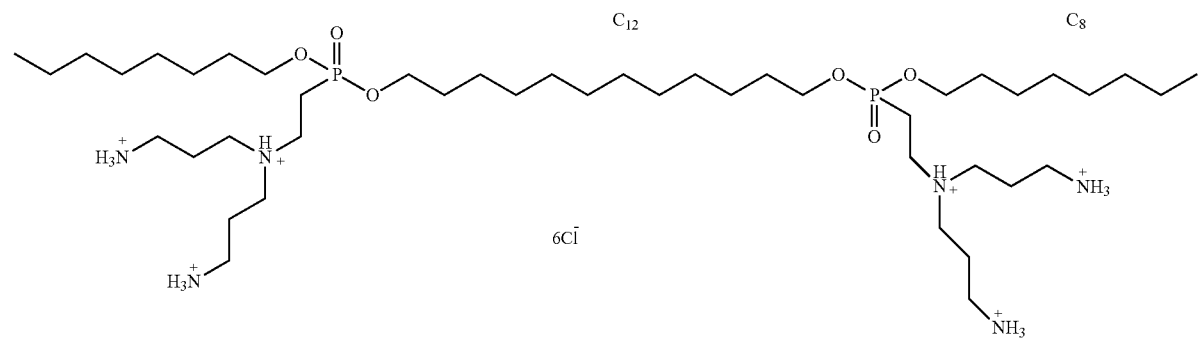

Dodecan-1,10-diyl dioctyl bis((2-(bis(3-aminopropyl)amino)ethyl)phosphonate) tetrahydrochloride is prepared from compound in Example 6 using general methods C, D, and E, in the form of a white amorphous solid in overall yield 36% (0.67 g, 0.61 mmol).

$^1$H NMR (500.2 MHz, CD$_3$OD): 0.88-0.93 (m, 6H, CH$_3$(CH$_2$)$_6$CH$_2$O); 1.26-1.46 (m, 36H, CH$_3$(CH$_2$)$_5$CH$_2$CH$_2$O, OCH$_2$CH$_2$(CH$_2$)$_8$CH$_2$CH$_2$O); 1.68-1.76 (m, 8H, CH$_3$(CH$_2$)$_5$ CH$_2$CH$_2$O, OCH$_2$CH$_2$(CH$_2$)$_s$CH$_2$CH$_2$O); 2.15-2.25 (m, 8H, NCH$_2$CH$_2$NH$_2$); 2.46-2.57 (m, 4H, PCH$_2$CH$_2$N); 3.10 (t, 8H, J$_{vic}$=7.5, NCH$_2$CH$_2$CH$_2$NH$_2$); 3.34-3.41 (m, 8H, NCH$_2$CH$_2$CH$_2$NH$_2$); 3.41-3.48 (m, 4H, PCH$_2$CH$_2$N); 4.09-4.16 (m, 8H, CH$_3$(CH$_2$)$_5$CH$_2$CH$_2$O, OCH$_2$CH$_2$(CH$_2$)$_8$CH$_2$CH$_2$O).

$^{13}$C NMR (125.8 MHz, CD$_3$OD): 14.45 (CH$_3$(CH$_2$)$_6$CH$_2$O); 21.24 (d, J$_{C,P}$=140.4, PCH$_2$CH$_2$N); 23.29 (NCH$_2$CH$_2$CH$_2$NH$_2$); 23.71, 26.64, 26.64, 30.26, 30.35, 30.36, 30.74, 30.77 (CH$_3$(CH$_2$)$_5$CH$_2$CH$_2$O, OCH$_2$CH$_2$(CH$_2$)$_8$CH$_2$CH$_2$O); 31.61, 31.63 (d, J$_{C,P}$=5.8, CH$_3$(CH$_2$)$_5$ CH$_2$CH$_2$O, OCH$_2$CH$_2$(CH$_2$)$_8$CH$_2$CH$_2$O); 32.98 (CH$_3$(CH$_2$)$_5$ CH$_2$CH$_2$O); 37.88 (NCH$_2$CH$_2$CH$_2$NH$_2$); 48.80 (PCH$_2$CH$_2$N); 51.08 (NCH$_2$CH$_2$CH$_2$NH$_2$); 68.26 (d, J$_{C,P}$=6.7, CH$_3$(CH$_2$)$_5$CH$_2$CH$_2$O, OCH$_2$CH$_2$(CH$_2$)$_8$CH$_2$CH$_2$O).

$^{31}$P{$^1$H} NMR (202.5 MHz, CD$_3$OD): 26.67.

HR-MS (ESI$^+$) For C$_{44}$H$_{100}$N$_6$O$_6$P$_2$ (M+2H)$^{2+}$ z=2 calcd 435.35843, found 435.35823.

Example 50: Bis(2-benzylethyl)-dodecane-1,12-diyl bis((2-(bis(3-aminopropyl)amino)ethyl)-phosphonate) hexahydrochloride Bis(2-benzylethyl)-dodecane-1,12-diyl bis((2-(bis(3-aminopropyl)amino)ethyl) phosphonate) hexahydrochloride is prepared from the compound from Example 7 (1 g, 5 mmol) and bis(3-tert-butyloxycarbonylaminopropyl)amine (1.37 g, 4.14 mmol) using general methods C, D and E in 15% (0.78 g, 0.73 mmol) overall yield in the form of white amorphous powder.

$^1$H NMR (500.2 MHz, CD$_3$OD): 1.28-1.37 (m, 16H, OCH$_2$CH$_2$(CH$_2$)$_s$CH$_2$CH$_2$O); 1.59-1.67 (m, 4H, OCH$_2$CH$_2$(CH$_2$)$_8$CH$_2$CH$_2$O); 2.13-2.22 (m, 8H, NCH$_2$CH$_2$CH$_2$NH$_2$); 2.41-2.51 (m, 4H, PCH$_2$CH$_2$N); 3.03 (t, 4H, J$_{vic}$=6.6, OCH$_2$CH$_2$Ph); 3.09 (t, 8H, J$_{vic}$=7.5, NCH$_2$CH$_2$CH$_2$NH$_2$); 3.30-3.36 (m, 12H, NCH$_2$CH$_2$CH$_2$NH$_2$, PCH$_2$CH$_2$N); 3.91-4.03 (m, 4H, OCH$_2$CH$_2$(CH$_2$)$_s$CH$_2$CH$_2$O); 4.30-4.40 (m, 4H, OCH$_2$CH$_2$Ph).

$^{13}$C NMR (125.8 MHz, CD$_3$OD): 21.18 (d, J$_{C,P}$=140.5, PCH$_2$CH$_2$N); 23.23 (NCH$_2$CH$_2$CH$_2$NH$_2$); 26.53, 30.25, 30.64, 30.68 (OCH$_2$CH$_2$(CH$_2$)$_8$CH$_2$CH$_2$O); 31.50 (d, J$_{C,P}$=6.0, OCH$_2$CH$_2$(CH$_2$)$_s$CH$_2$CH$_2$O); 37.71 (d, J$_{C,P}$=6.3, OCH$_2$CH$_2$Ph); 37.86 (NCH$_2$CH$_2$CH$_2$NH$_2$); 48.68 (PCH$_2$CH$_2$N); 51.04 (NCH$_2$CH$_2$CH$_2$NH$_2$); 68.11 (d, J$_{C,P}$=6.8, OCH$_2$CH$_2$(CH$_2$)$_s$CH$_2$CH$_2$O); 68.58 (d, J$_{C,P}$=6.8, OCH$_2$CH$_2$Ph).

$^{31}$P{$^1$H} NMR (202.5 MHz, CD$_3$OD): 26.48.

IR v$_{max}$ (KBr) 3064 (s, sh), 3015 (s), 2927 (vs), 2854 (s), 2848 (m, sh), 2635 (m, vbr), 2556 (m, vbr), 2037 (w, vbr), 1618 (m), 1607 (m, sh), 1520 (w, sh), 1497 (m), 1467, 1455 (m), 1395 (w, br), 1256 (m, sh), 1230 (m), 1155 (w), 1061 (m), 1009 (s), 999 (s), 847 (vw), 751 (w), 700 (m).

HR-MS (ESI$^+$): For C$_{44}$H$_{84}$O$_6$N$_6$P$_2$ (M+H)$^+$ m/2z calculated 427.29583, found 427.29547±0.84009 ppm.

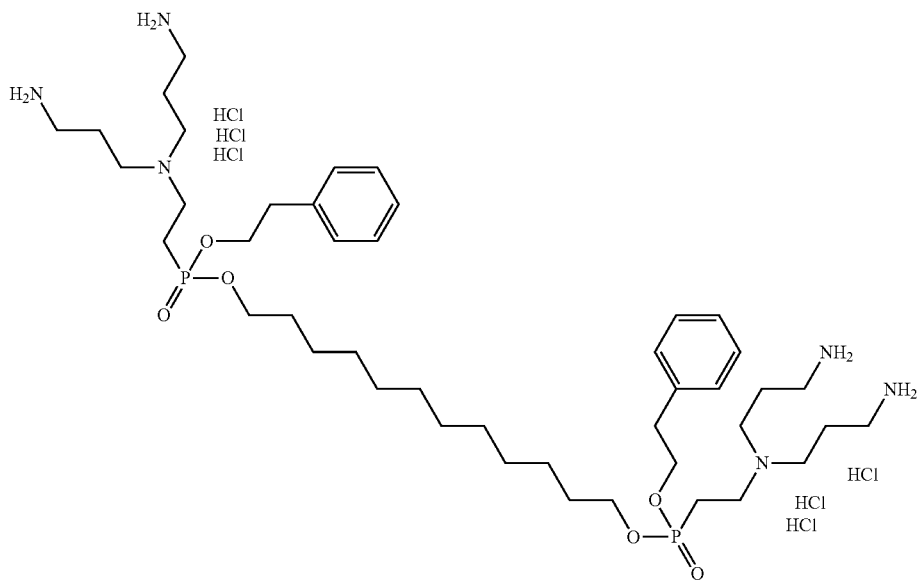

Example 51: Tetradecane-1,14-diyl diisobutyl bis ((2-(bis(3-aminopropyl)amino)ethyl)-phosphonate) hexahydrochloride

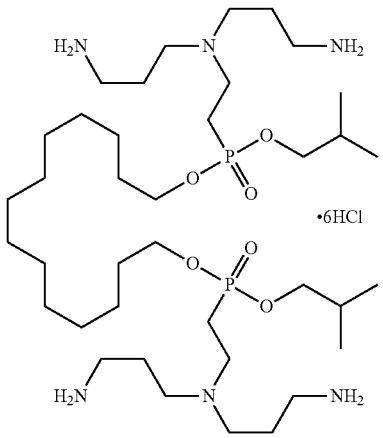 [SMILES: CC(C)COP(=O)(CCN(CCCN)CCCN)OCCCCCCCCCCCCCCOP(=O)(CCN(CCCN)CCCN)OCC(C)C]

Tetradecane-1,14-diyl diisobutyl bis((2-(bis(3-aminopropyl)amino)ethyl)phosphonate) hexahydrochloride is prepared from the compound from Example 32 (496 mg, 0.949 mmol) using general methods D and E in 43% (409 mg, 0.407 mmol) overall yield in the form of white amorphous powder.

$^1$H NMR (401 MHz, Methanol-$d_4$) δ 4.15 (dt, J=7.7, 6.6 Hz, 4H), 3.92 (td, J=6.6, 2.5 Hz, 4H), 3.52-3.43 (m, 4H), 3.43-3.36 (m, 8H), 3.11 (t, J=7.5 Hz, 8H), 2.64-2.45 (m, 4H), 2.22 (h, J=7.7, 7.1 Hz, 8H), 1.99 (dp, J=13.3, 6.6 Hz, 2H), 1.84-1.64 (m, 4H), 1.53-1.22 (m, 20H), 1.00 (d, J=6.7 Hz, 12H).

$^{31}$P NMR (162 MHz, Methanol-$d_4$) δ 28.60.

$^{13}$C NMR (101 MHz, Methanol-$d_4$) δ 73.92 (d, J=7.0 Hz), 68.29 (d, J=6.8 Hz), 51.07, 37.86, 31.62 (d, J=5.8 Hz), 30.81, 30.76, 30.71, 30.46 (d, J=6.3 Hz), 30.31, 26.62, 23.30, 21.87, 20.48, 19.03. IR $v_{max}$ (KBr tab. 1 mm) 3200-2700 (vs, vbr), 2960 (s), 2926 (vs), 2854 (s), 2700-2500 (m), 1608 (m), 1511 (m), 1468 (m), 1400 (m), 1369 (w), 1227 (s), 1004 (vs), 852 (m), 768 (w), —725 (w, sh).

HR-MS (ESI$^+$): For $C_{38}H_{87}O_6N_6P_2$ (M+H)$^+$ m/z calculated 785.61568, found 785.61523±0.57208 ppm.

Example 52: Dibutyl tetradecane-1,14-diyl bis((2-(bis(3-aminopropyl)amino)ethyl)phosphonate) hexahydrochloride

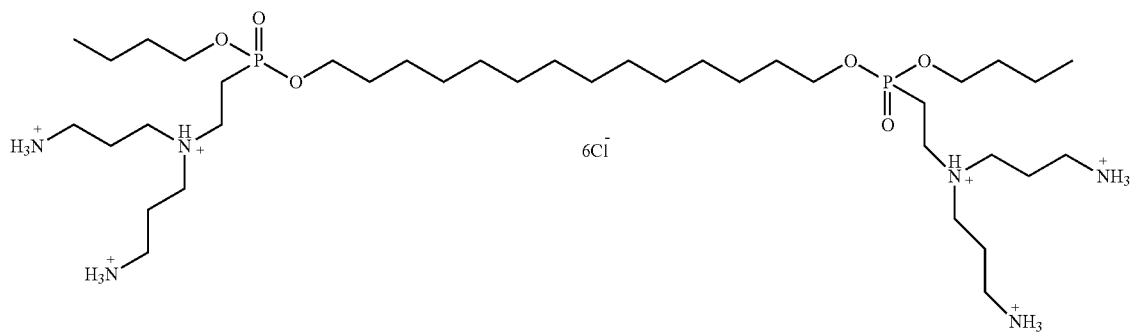

Dibutyl tetradecane-1,14-diyl bis((2-(bis(3-aminopropyl)amino)ethyl)phosphonate) hexahydrochloride is prepared from compound in Example 30 (0.46, 0.88 mmol) using general methods D and E, in the form of a white amorphous solid in overall yield 57% (0.50 g, 0.50 mmol).

$^1$H NMR (400.1 MHz, CD$_3$OD): 0.95-0.99 (m, 6H), 1.31-1.50 (m, 24H), 1.67-1.76 (m, 8H), 2.16-2.24 (m, 8H), 2.47-2.57 (m, 4H), 3.10 (t, 8H, J$_{vic}$=8.0), 3.35-3.42 (m, 8H), 3.44-3.48 (m, 4H), 4.10-4.17 (m, 8H).

$^{13}$C NMR (100.6 MHz, CD$_3$OD): 13.96, 21.24 (d, J$_{C,P}$=140.8), 23.28, 19.80, 26.61, 30.30, 30.70, 30.75, 30.79, 31.59, 33.61 (d, J$_{C,P}$=6.0), 37.86, 48.90, 51.08, 67.92, 68.27 (d, J$_{C,P}$=6.0).

$^{31}$P{$^1$H} NMR (162.0 MHz, CD$_3$OD): 28.40.

IR $v_{max}$ (KBr) 2966 (m), 2928 (m), 2625 (m), 1604 (m), 1468 (m), 1384 (m), 1230 (m), 1050 (m), 1021 (m).

HR-MS (ESI$^+$): For $C_{38}H_{87}N_6O_6P_2$ (M+H)$^+$ calcd 785.61506, found 785.61568.

Example 53: Tetradecane-1,14-diyl dipentyl bis((2-(bis(3-aminopropyl)amino)ethyl)-phosphonate) hexahydrochloride

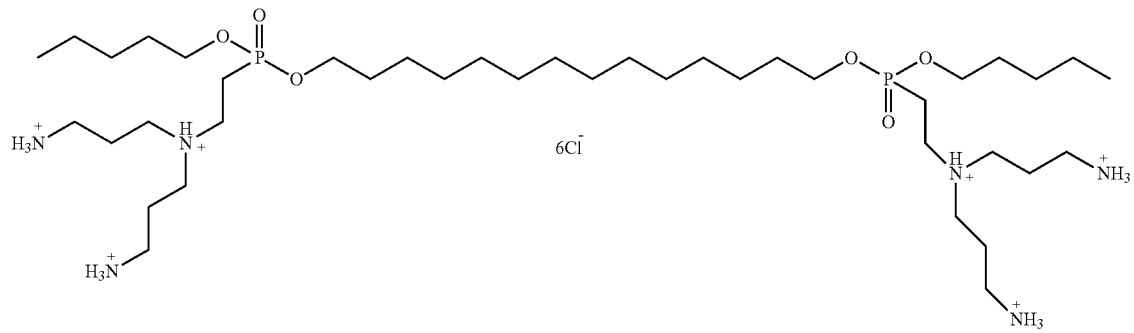

Tetradecane-1,14-diyl dipentyl bis((2-(bis(3-aminopropyl)amino)ethyl)phosphonate) hexahydrochloride is prepared from compound in Example 27 (0.61, 1.12 mmol) using general methods D and E, in the form of a white amorphous solid in overall yield 57% (0.68 g, 0.65 mmol).

$^1$H NMR (400.1 MHz, CD$_3$OD): 0.92-0.97 (m, 6H), 1.34-1.44 (m, 28H), 1.69-1.76 (m, 8H), 2.17-2.25 (m, 8H), 2.48-2.58 (m, 4H), 3.10 (t, 8H, J$_{vic}$=8.0), 3.37-3.43 (m, 8H), 3.44-3.49 (m, 4H), 4.10-4.16 (m, 8H).

$^{13}$C NMR (100.6 MHz, CD$_3$OD): 14.34, 21.25 (d, J$_{C,P}$=139.8), 23.26, 23.30, 26.62, 28.80, 30.31, 30.70, 30.74, 30.79, 31.29, 31.61 (d, J$_{C,P}$=4.0, 6.0), 37.87, 48.83, 51.06 (NCH$_2$CH$_2$CH$_2$NH$_2$); 68.21, 68.27 (d, J$_{C,P}$=4.0, 5.0, CH$_3$(CH$_2$)$_2$CH$_2$CH$_2$O, OCH$_2$CH$_2$(CH$_2$)$_{10}$CH$_2$CH$_2$O).

$^{31}$P{$^1$H} NMR (162.0 MHz, CD$_3$OD): 28.41

IR v$_{max}$ (KBr) 2928 (s), 2623 (m), 2553 (m), 1598 (m), 1468 (m), 1230 (m), 1171 (m), 1080 (m, sh), 1047 (m), 995 (vs).

HR-MS (ESI$^+$): For C$_{40}$H$_{91}$N$_6$O$_6$P$_2$ (M+H)$^+$ calcd 813.64643, found 813.64698.

Example 54: Dihexyl tetradecan-1,14-diyl bis((2-(bis(3-aminopropyl)amino)ethyl)-phosphonate) tetrahydrochloride Dihexyl tetradecan-1,14-diyl bis((2-(bis(3-aminopropyl)amino)ethyl)phosphonate) tetrahydrochloride is prepared from compound in Example 27 (0.85 g, 1.47 mmol) and bis(3-tert-butyloxykarbonylaminopropyl)amine (1.95 g, 5.88 mmol) using general methods D and E, in the form of a white amorphous solid in overall yield 65% (0.93 g, 0.95 mmol).

$^1$H NMR (400.1 MHz, CD$_3$OD): 0.91-0.94 (m, 6H, CH$_3$(CH$_2$)$_4$CH$_2$O); 1.33-1.44 (m, 32H, CH$_3$(CH$_2$)$_3$CH$_2$CH$_2$O, OCH$_2$CH$_2$(CH$_2$)$_1$CH$_2$CH$_2$O); 1.69-1.76 (m, 8H, CH$_3$(CH$_2$)$_3$ CH$_2$CH$_2$O, OCH$_2$CH$_2$(CH$_2$)$_{10}$CH$_2$CH$_2$O); 2.17-2.25 (m, 8H, NCH$_2$CH$_2$CH$_2$NH$_2$); 2.48-2.57 (m, 4H, PCH$_2$CH$_2$N); 3.10 (t, 8H, J$_{vic}$=8.0, NCH$_2$CH$_2$CH$_2$NH$_2$); 3.37-3.41 (m, 8H, NCH$_2$CH$_2$CH$_2$NH$_2$); 3.42-3.48 (m, 4H, PCH$_2$CH$_2$N); 4.10-4.16 (m, 8H, CH$_3$(CH$_2$)$_4$CH$_2$O, OCH$_2$CH$_2$(CH$_2$)$_{10}$ CH$_2$CH$_2$O).

$^{13}$C NMR (100.6 MHz, CD$_3$OD): 12.99 (CH$_3$(CH$_2$)$_4$ CH$_2$O); 19.90 (d, J$_{C,P}$=139.8, PCH$_2$CH$_2$N); 21.87 (NCH$_2$CH$_2$CH$_2$NH$_2$); 22.24, 24.92, 25.24, 28.92, 29.32, 29.36, 29.41 (CH$_3$CH$_2$CH$_2$CH$_2$CH$_2$CH$_2$O, OCH$_2$CH$_2$(CH$_2$)$_{10}$CH$_2$CH$_2$O); 29.34 (d, J$_{C,P}$=4.0, CH$_3$(CH$_2$)$_3$CH$_2$CH$_2$O, OCH$_2$CH$_2$(CH$_2$)$_{10}$CH$_2$CH$_2$O); 31.11 (CH$_3$CH$_2$CH$_2$CH$_2$CH$_2$CH$_2$O); 36.48 (NCH$_2$CH$_2$CH$_2$NH$_2$); 47.44 (PCH$_2$CH$_2$N); 49.68 (NCH$_2$CH$_2$CH$_2$NH$_2$); 66.82, 66.89 (d, J$_{C,P}$=2.0, CH$_3$(CH$_2$)$_4$CH$_2$O, OCH$_2$CH$_2$(CH$_2$)$_{10}$ CH$_2$CH$_2$O).

$^{31}$P{$^1$H} NMR (162.0 MHz, CD$_3$OD): 28.40.

IR v$_{max}$ (KBr) 2925 (s), 2957 (s), 2857 (s), 2678 (m), 2488 (m, sh), 1608 (m,sh). 1489 (m), 1467 (m), 1391 (m), 1227 (s), 1037 (m), 992 (s).

HR-MS (ESI$^+$): For C$_{49}$H$_{96}$N$_6$O$_6$P$_2$ (M+2H)$^{2+}$ calcd 421.34278, found 421.34226.

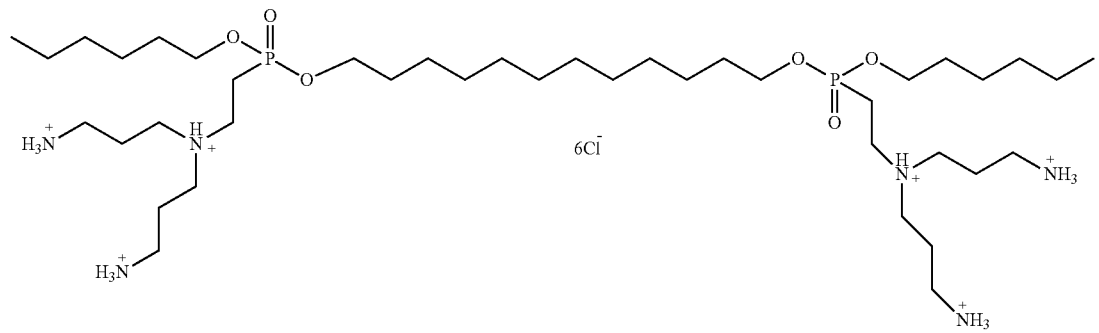

Example 55: Dihexyl octane-1,8-diyl bis((2-(bis(2-aminoethyl)amino)ethyl)phosphonate) hexahydrochloride

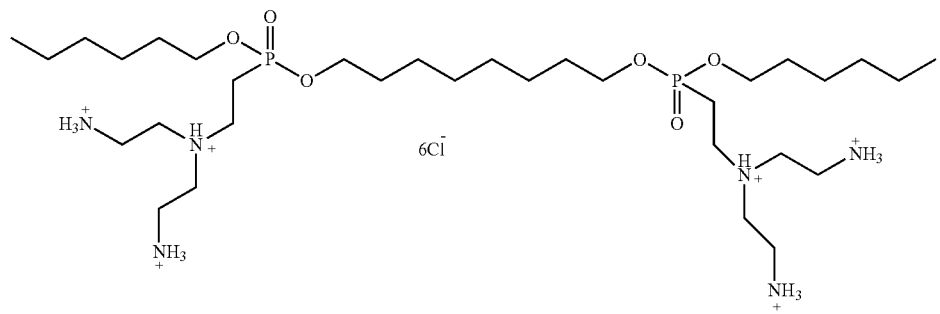

Dihexyl octane-1,8-diyl bis((2-(bis(2-aminoethyl)amino)ethyl)phosphonate) hexahydrochloride is prepared from compound in Example 21 (0.40, 0.81 mmol) using general methods D and E, in the form of a white amorphous solid in 31% overall yield (0.21 g, 0.25 mmol).

$^1$H NMR (400.1 MHz, CD$_3$OD): 0.90-0.94 (m, 6H), 1.32-1.45 (m, 20H), 1.68-1.76 (m, 8H), 2.31-2.40 (m, 4H), 3.10-3.26 (m, 12H), 3.29-3.31 (m, 8H), 4.06-4.14 (m, 8H).

$^{13}$C NMR (100.6 MHz, CD$_3$OD): 14.38, 21.78 (d, $J_{C,P}$=138.8), 23.63, 26.33, 26.54, 26.58, 30.18, 31.57, 32.51 (d, $J_{C,P}$=5.0), 36.96, 48.42, 51.50, 67.89, 67.96 (d, $J_{C,P}$=3.0, 4.0).

$^{31}$P{$^1$H} NMR (162.0 MHz, CD$_3$OD): 31.25.

IR $\nu_{max}$ (KBr) 2926 (m), 2793 (s), 2677 (m), 2617 (m), 2542 (s), 2438 (m, sh), 1611 (m), 1514 (m), 1467 (m), 1390 (m), 1228 (s), 1050 (m, sh), 990 (s).

HR-MS (ESI$^+$): For C$_{30}$H$_{69}$N$_4$O$_6$P$_2$ (M+H)$^+$ calcd 701.52178, nalezeno 701.52194.

Example 56: Dibutyl decane-1,10-diyl bis((2-(bis(2-aminoethyl)amino)ethyl)phosphonate) hexahydrochloride

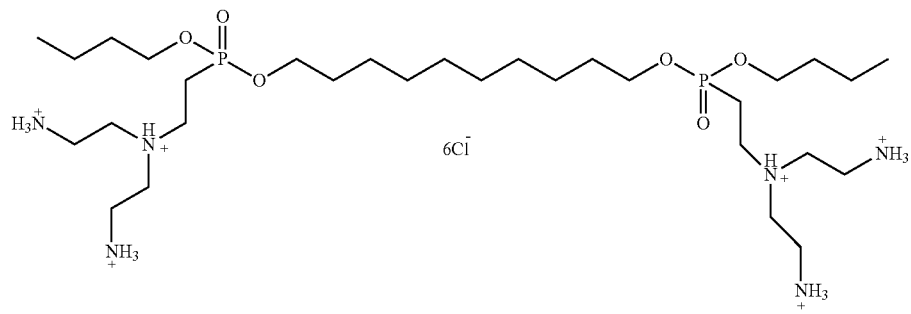

Dibutyl decane-1,10-diyl bis((2-(bis(2-aminoethyl)amino)ethyl)phosphonate) hexahydrochloride is prepared from compound in Example 28 (0.83, 1.77 mmol) using general methods D and E, in the form of a white amorphous solid in 29% overall yield (0.40 g, 0.49 mmol).

$^1$H NMR (400.1 MHz, CD$_3$OD): 0.95-0.99 (m, 6H), 1.34-1.50 (m, 16H), 1.66-1.75 (m, 8H), 2.25-2.33 (m, 4H), 3.10-3.16 (m, 12H), 3.23-3.27 (m, 8H), 4.05-4.13 (m, 8H).

$^{13}$C NMR (100.6 MHz, CD$_3$OD): 12.57, 20.81 (d, J=138.8), 18.42, 25.23, 28.87, 29.20, 30.20, 32.20 (d, $J_{C,P}$=6.0), 35, 47.10 50.10, 66.2, 66.6 (d, J=7.0).

$^{31}$P{$^1$H} NMR (162.0 MHz, CD$_3$OD): 28.43.

IR $\nu_{max}$ (KBr) 2961 (m), 2926 (m), 2674 (m, sh), 2551 (m, br), 1613, (m), 1467 (m), 1391 (m), 1260 (m), 1236 (m), 1066 (m, sh), 991 (m, sh).

HR-MS (ESI$^+$): For C$_{30}$H$_{71}$N$_6$O$_6$P$_2$ (M+H)$^+$ calcd 673.49047, found 673.49048.

Example 57: Hexane-1,6-diyl di((Z)-oct-3-en-1-yl) bis((2-(bis(3-aminopropyl)amino)-ethyl)phosphonate) hexahydrochloride

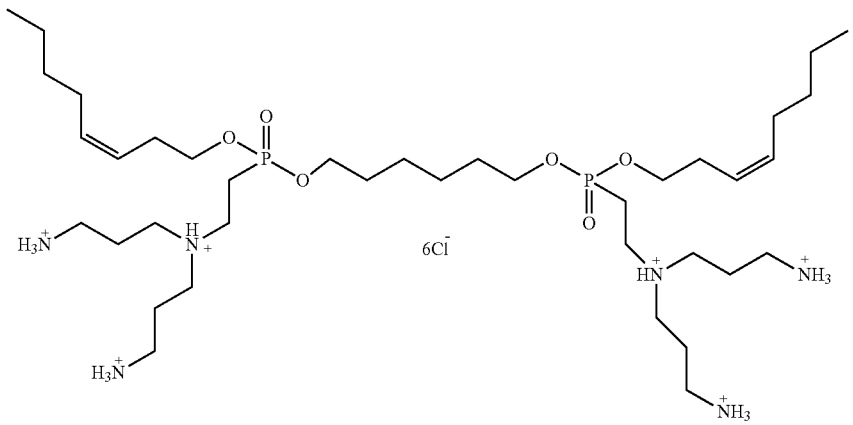

Hexane-1,6-diyl di((Z)-oct-3-en-1-yl) bis((2-(bis(3-aminopropyl)amino)ethyl)phosphonate) hexahydrochloride is prepared from compound in Example 17 (0.59, 1.14 mmol) using general methods D and E, in the form of a white amorphous solid in 50% overall yield (0.66 g, 0.66 mmol).

$^1$H NMR (400.1 MHz, CD$_3$OD): 0.89-0.93 (m, 6H), 1.32-1.37 (m, 8H), 1.44-1.51 (m, 4H), 1.70-1.78 (m, 4H), 2.06-2.11 (m, 4H), 2.20-2.27 (m, 8H), 2.43-2.50 (m, 4H), 2.54-2.63 (m, 4H), 3.13 (t, 8H, J$_{C,P}$=8.0), 3.38-3.49 (m, 12H), 4.09-4.20 (m, 8H), 5.38-5.45 (m, 2H), 5.53-5.60 (m, 2H).

$^{13}$C NMR (100.6 MHz, CD$_3$OD): 13.01, 20.06 (d, J$_{C,P}$=36.8), 21.83, 21.99, 24.77, 26.71, 28.27 (d, J$_{C,P}$=6.0), 29.98 (d, J$_{C,P}$=6.0), 31.53, 36.59, 47.54, 49.65, 66.23 (d, J$_{C,P}$=7.0), 66.67 (dd, J$_{C,P}$=7.0, 2.0), 123.68, 132.89.

$^{31}$P{$^1$H} NMR (162.0 MHz, CD$_3$OD): 28.46.

IR v$_{max}$ (KBr) 3432 (m, br), 3015 (s), 2957 (vs), 2931 (vs), 2872 (s), 2500-2300 (vs, vbr), 1611 (m), 1467 (m), 1380 (w, sh), 1228 (m), 1055 (s), 1003 (s).

HR-MS (ESI$^+$): For C$_{38}$H$_{84}$O$_6$N$_6$P$_2$ (M+2H)$^{2+}$ calcd 391.29583, found 391.29589.

Example 58: Di((Z)-oct-3-en-1-yl) pentane-1,5-diyl bis((2-(bis(3-aminopropyl)amino)ethyl)-phosphonate) hexahydrochloride Di((Z)-oct-3-en-1-yl) pentane-1,5-diyl bis((2-(bis(3-aminopropyl)amino)ethyl)phosphonate) hexahydrochloride is prepared from compound in Example 16 (0.54, 1.07 mmol) using general methods D and E, in the form of a white amorphous solid in 51% overall yield (0.53 g, 0.54 mmol).

$^1$H NMR (400.1 MHz, CD$_3$OD): 0.90-0.93 (m, 6H), 1.28-1.39 (m, 8), 1.51-1.59 (m, 2H), 1.74-1.81 (m, 4H), 2.06-2.11 (4H), 2.21-2.28 (m, 8H), 2.45-2.51 (m, 4H), 2.57-2.66 (m, 4H), 3.14 (t, 8H, J$_{vic}$=7.5), 3.42-3.50 (m, 12H), 4.09-4.22 (m, 8H), 5.39-5.45 (m, 2H), 5.52-5.58 (m, 2H).

$^{13}$C NMR (100.6 MHz, CD$_3$OD): 13.0, 20.13 (d, J$_{C,P}$=139.8), 21.43, 21.82, 21.99, 26.72, 28.27 (d, J$_{C,P}$=6.0), 29.58 (d, J$_{C,P}$=6.0), 31.53, 36.62, 47.57, 49.65, 66.25 (d, J$_{C,P}$=6.0), 66.59 (dd, J$_{C,P}$=6.0), 123.71, 132.87.

$^{31}$P{$^1$H} NMR (162.0 MHz, CD$_3$OD): 28.45.

IR v$_{max}$ (KBr) 3435 (s, br), 3015 (m, sh), 2957 (m), 2927 (m), 2872 (m), 2857 (m), 2500-2300 (m, br), 1626 (w), 1467 (w), 1379 (w), 1275 (w, sh), 1226 (w), 1004 (m).

HR-MS (ESI$^+$):For C$_{37}$H$_{82}$O$_6$N$_6$P$_2$ (M+2H)$^{2+}$ calcd 384.28801, found 384.28824.

Antibacterial Activity

Antibacterial activity is measured using a standard microdilution method determining the minimum inhibitory concentration (MIC) of a test sample that results in the

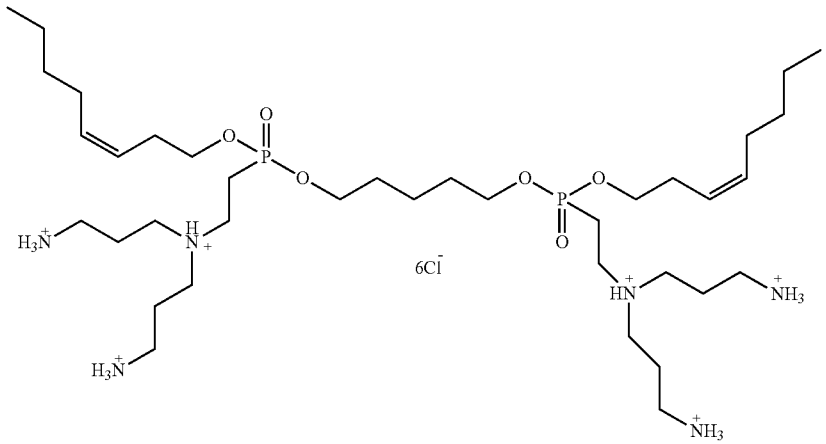

inhibition of bacterial growth. Disposable microtiter plates are used for testing. Samples are dissolved in infusion medium from brain and heart (BHI, HiMedia Laboraties Pvt. Ltd., Czech Republic) and Mueller-Hinton broth (HiMedia Laboraties, see above) to a final concentration ranging from 200 µg/ml to 1.5625 µg/ml. Plates are inoculated with a standard amount of test bacteria—the density of the inoculum in the well corresponds to $10^{5-6}$ CFU/ml (colony forming units/ml, i.e. the number of viable bacterial cells/ml). MIC values are read after 24/48 hours of incubation at 37° C. as the minimum inhibitory concentration of the test substance at which bacterial growth is inhibited. The minimum bactericidal concentration (MBC) is characterized as the minimum concentration of the sample required to achieve irreversible inhibition, i.e. to kill the bacteria after a defined incubation period. MBC is determined by the inoculation method. Using an applicator, 10 µl from the well of a microtiter plate with a defined concentration of the test substance is taken to inoculate the surface of blood agar (Trios, Czech Republic). MBC is determined as the lowest concentration that inhibits the visible growth of the bacterium used on agar.

TABLE 2

The antibacterial activity of the prepared substances measured as MIC (which in most cases corresponds to MBC at one dilution) as mentioned above. The underlined bacterial strains are representatives of resistant bacteria.

| Compound from example | Escherichia coli ATCC 25922 = CCM 3954 | Pseudomonas aeruginosa ATCC 27853 = CCM 3955 | Enterococcus faecalis ATCC 29212 = CCM 4224 | Staphylococcus aureus ATCC 29213 = CCM 4223 | Staphylococcus epidermidis CCM 7221 |
|---|---|---|---|---|---|
| 34 | 32 | >128 | 128 | 8 | 4 |
| 35 | 0.5 | 2 | 1 | 0.5 | 0.5 |
| 36 | 128 | >128 | >128 | 16 | 4 |
| 37 | 2 | 16 | 16 | 1 | 0.5 |
| 39 | 128 | 128 | 64 | 32 | 8 |
| 40 | >128 | >128 | 128 | 16 | 4 |
| 41 | 64 | 16 | 32 | 2 | 1 |
| 42 | 2 | 4 | 4 | 0.5 | 0.5 |
| 43 | 0.5 | 1 | 0.5 | 0.5 | 0.5 |
| 44 | 2 | 4 | 2 | 2 | 1 |
| 45 | >128 | 32 | 32 | 4 | 1 |
| 46 | 128 | 32 | 32 | 4 | 1 |
| 47 | 16 | 4 | 2 | 1 | 0.5 |
| 48 | 1 | 2 | 1 | 1 | 0.5 |
| 49 | 4 | 8 | 4 | 1 | 0.5 |
| 50 | 16 | 4 | 4 | 2 | 0.5 |
| 51 | 16 | 4 | 4 | 2 | 0.5 |
| 52 | 2 | 4 | 1 | 1 | 0.5 |
| 53 | 1 | 2 | 1 | 0.5 | 0.5 |
| 54 | 4 | 8 | 8 | 1 | 0.5 |
| 55 | >128 | 64 | 128 | 2 | 2 |
| 56 | 4 | 4 | 2 | 2 | 4 |
| 57 | 2 | 16 | 16 | 1 | 0.5 |
| 58 | 8 | 32 | 2 | 0.5 | 2 |

| Compound from example | Staphylococcus aureus 4591 | Enterococcus faecium 419/ANA | Escherichia coli CE5556 | Enterobacter kobei 3683 | Pseudomonas aeruginosa R | Candida albicans ATCC 90028 = CCM 8161 |
|---|---|---|---|---|---|---|
| 34 | 16 | >128 | 128 | >128 | >128 | 128 |
| 35 | 1 | 8 | 1 | 2 | 2 | 16 |
| 36 | 8 | >128 | >128 | >128 | 128 | 128 |
| 37 | 2 | >128 | 8 | >128 | 64 | 32 |
| 39 | 16 | 128 | 128 | >128 | 64 | >128 |
| 40 | 8 | >128 | >128 | >128 | >128 | 128 |
| 41 | 2 | 128 | 128 | >128 | 8 | 64 |
| 42 | 1 | 32 | 8 | 64 | 8 | 16 |
| 43 | 0.5 | 1 | 1 | 1 | 1 | 1 |
| 44 | 1 | 2 | 2 | 2 | 4 | 4 |
| 45 | 4 | 128 | >128 | >128 | 16 | 64 |
| 46 | 4 | >128 | >128 | >128 | 16 | 64 |
| 47 | 1 | 16 | 32 | 128 | 4 | 16 |
| 48 | 1 | 1 | 1 | 1 | 2 | 2 |
| 49 | 4 | 32 | 16 | 128 | 8 | 8 |
| 50 | 1 | 2 | 2 | 8 | 2 | 4 |
| 51 | 2 | 16 | 32 | 64 | 4 | 32 |
| 52 | 1 | 2 | 2 | 8 | 2 | 4 |
| 53 | 1 | 2 | 1 | 2 | 4 | 2 |
| 54 | 1 | 64 | 16 | >128 | 8 | 16 |
| 55 | 4 | >128 | >128 | >128 | 64 | 32 |
| 56 | 4 | 4 | 4 | 16 | 8 | 4 |
| 57 | 1 | 64 | 2 | nd | 16 | 64 |
| 58 | 128 | 4 | 4 | nd | 32 | 64 |

Testing of Haemolytic Activity of soluble Samples

Blood from three donors is mixed and centrifuged (10 min, 1000 g, 4° C.). The erythrocytes obtained are washed three times with NaCl solution (150 mmol·l$^{-1}$) and then used for experiments. Sample stock solutions are prepared in DMSO so that the final concentration of DMSO in NaCl is 0.5% (v/v). NaCl solution with the appropriate volume of DMSO serves as the negative control. 1% Triton-X100 is the positive control. The erythrocytes obtained are diluted to 2% with NaCl solution and pipetted into Eppendorf tubes (250 µl) with constant stirring. Samples and positive and negative controls are added to the erythrocytes prepared in this way and incubated (3 hours, 37° C.). The tubes are stirred during the incubation. After centrifugation (5 min, 1000 g), haemolytic activity is monitored by haemoglobin determination. The $HC_{50}$ value is calculated from the measured absorbance values. The test is performed in triplets in three independent replicates. Iron $Fe^{2+}$ in haemoglobin is oxidized with potassium ferricyanide to iron $Fe^{3+}$ in methaemoglobin, which produces stable cyanomethaemoglobin with potassium cyanide, the concentration of which is determined spectrophotometrically. After the incubation of the erythrocytes with the substances, the cells are centrifuged (5 min, 1000 g), then Drabkin's solution (200 µl) is added to the supernatant (40 µl) and after incubation (10 min), the absorbance at 540 nm is measured.

Toxicity Testing of soluble Samples

The toxicity testing of soluble samples was performed on a Balb/c 3T3 mouse fibroblast cell line. The cryopreserved cells are taken out from the deep-freezer, left for 1 min at room temperature and then sterile transferred to a 25 cm$^2$ flask with 10 ml of culture medium (DMEM, penicillin 100 U·ml$^{-1}$, L-glutamine 2 mmol·l$^{-1}$, streptomycin 100 mg·l$^{-1}$, fetal calf serum 5%, neonatal calf serum 5%). The cells are stored in an incubator saturated with water vapour at 37° C. and in an atmosphere of 5% $CO_2$, the medium is changed every 48-72 h. After reaching the monolayer, the cells are washed with sterile PBS (5 ml), released by incubation with 0.25% trypsin solution with EDTA (0.5 ml; 2-3 min, 37° C.), 5 ml of culture medium is added, and the samples are centrifuged (10 min, 1300 rpm, room temperature). The pellet is resuspended in 20 ml of culture medium and the cells are transferred to a 75 cm$^2$ culture flask and further cultured. After reaching the monolayer, the cells are washed with sterile PBS (10 ml), released by incubation with 0.25% trypsin solution with EDTA (1 ml; 2-3 min; 37° C.), and resuspended in 10 ml of culture medium. The suspension is centrifuged (10 min; 1300 rpm; room temperature). The pellet is resuspended in 10 ml of culture medium and the cells are used in experiments.

Stock solutions are prepared in DMSO so that the final concentration of DMSO in the medium is 0.5% (v/v). Control cells are prepared by incubation with an appropriate volume of DMSO.

Cell concentrations are determined by trypan blue staining. The cells are diluted in culture medium and plated in 96-well plates at a concentration of 2×10$^5$ cells/ml at 0.2 ml per well. After incubating the culture for 24 hours (Jouan incubator-controlled atmosphere 95% air, 5% $CO_2$, steam saturation, 37° C.), the culture medium is changed to serum-free medium containing the test substances and incubated for 24 hours in the incubator under the above conditions. After 24 h of incubation (37° C., 5% $CO_2$), cell damage is monitored by determining mitochondrial dehydrogenase activity (MTT assay). The $IC_{50}$ value is calculated from the measured absorbance values. The test is performed in three independent replicates.

The yellow tetrazolium salt of MTT is reduced by mitochondrial dehydrogenases of metabolically active cells to a purple, water-insoluble formazan dye, the concentration of which, after dissolution in an organic solvent, is determined spectrophotometrically at 570 nm (Sieuwerts, 1995).

TABLE 3

Toxicity of test substances determined by MTT test in Balb/c 3T3 mouse fibroblast line

| Compound from Example | $HC_{50}$ ± SD | $IC_{50}$ ± SD |
|---|---|---|
| 34 | >100 | >100 |
| 35 | >100 | 12 |
| 36 | >100 | >100 |
| 37 | >100 | 76.4 |
| 39 | >100 | 53.5 |
| 40 | >100 | >100 |
| 41 | >100 | 41.3 |
| 42 | 74.5 | 19.3 |
| 43 | 6 | 2.1 |
| 44 | 5 | 4 |
| 45 | >100 | 55.5 |
| 46 | >100 | 31.7 |
| 47 | >100 | 6.3 |
| 48 | 4 | 2.1 |
| 49 | >100 | 8.4 |
| 50 | >100 | 4.9 |
| 51 | >100 | 4.5 |
| 52 | 56.4 | 2.4 |
| 53 | 10.6 | 2.1 |
| 54 | >100 | 32 |
| 55 | >100 | 70.2 |
| 56 | 16.8 | 2.7 |
| 57 | 34.8 | 62 |
| 58 | 70 | 100 |

INDUSTRIAL APPLICABILITY

The lipophosphonoxins according to the invention can be used, as antibacterial agents, as an active ingredient in pharmaceutical compositions for the treatment of hitherto resistant bacterial infections, in disinfectants and/or in selective culture media.

The invention claimed is:

1. A lipophosphonoxin of the general formula I

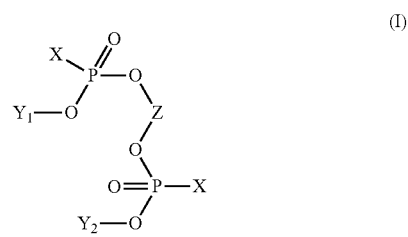

wherein:

the X substituent is independently selected from the following structures:

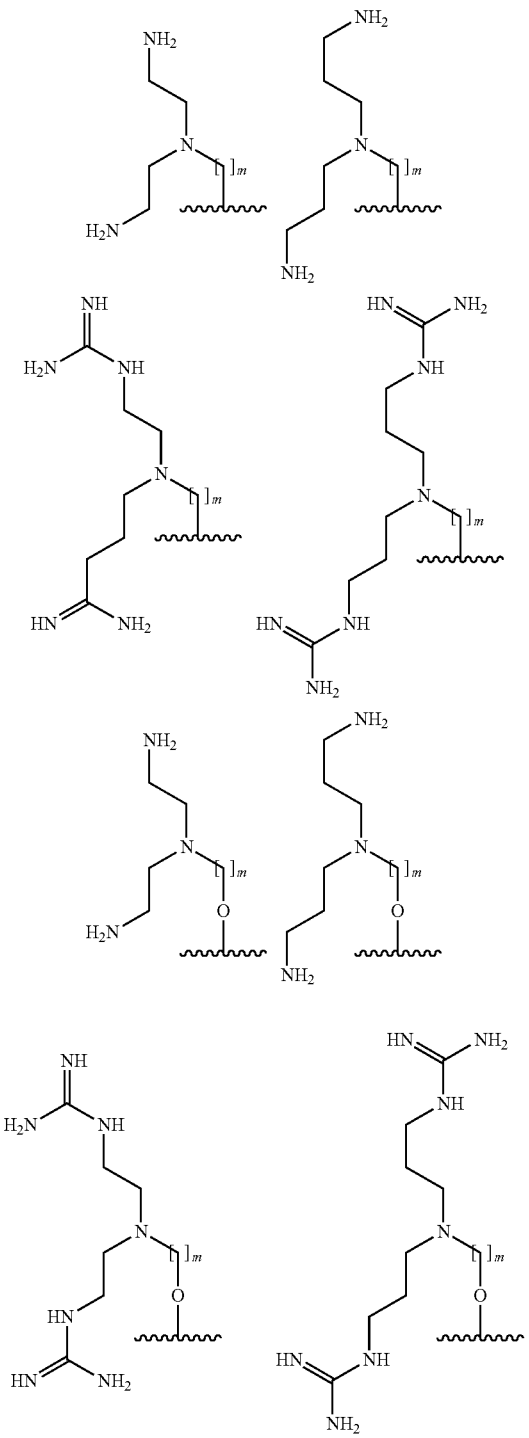

wherein m=1-3;

the Y1 and Y2 substituents are independently selected from the following structures:

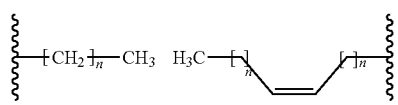

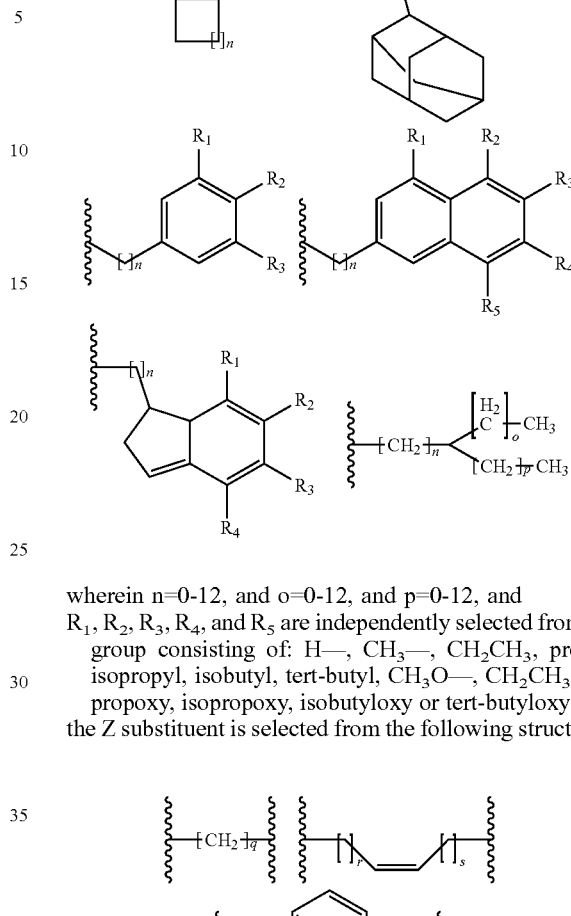

wherein n=0-12, and o=0-12, and p=0-12, and
R$_1$, R$_2$, R$_3$, R$_4$, and R$_5$ are independently selected from the group consisting of: H—, CH$_3$—, CH$_2$CH$_3$, propyl, isopropyl, isobutyl, tert-butyl, CH$_3$O—, CH$_2$CH$_3$O—, propoxy, isopropoxy, isobutyloxy or tert-butyloxy; and
the Z substituent is selected from the following structures:

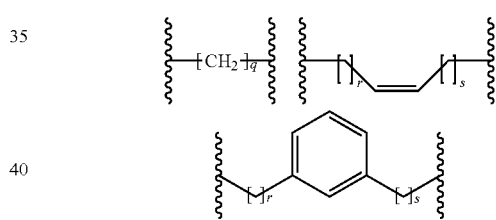

wherein q=2-14, and r=0-10, and s=0-10,
or a diastereomer or a mixture of diastereomers of the lipophosphonoxin of formula I, or a pharmaceutically acceptable salt or hydrate thereof.

2. A method of administering a medicament, comprising a step of administering lipophosphonoxin of general formula I according to claim 1 or a diastereomer or a pharmaceutically acceptable salt or hydrate thereof to a subject in need thereof.

3. A method of administering an antibacterial drug comprising a step of administering lipophosphonoxin of general formula I according to claim 1 or a diastereomer or a pharmaceutically acceptable salt or hydrate thereof to a subject in need thereof.

4. An antibacterial drug comprising at least one lipophosphonoxin of general formula I as claimed in claim 1, or a diastereomer or a pharmaceutically acceptable salt or hydrate thereof.

5. A disinfectant for non-therapeutic purposes comprising at least one lipophosphonoxin of general formula I as claimed in claim 1, or a diastereomer or a pharmaceutically acceptable salt or hydrate thereof as active ingredient.

6. A selective culture medium comprising at least one lipophosphonoxin of general formula I as claimed in claim 1, or a diastereomer or a pharmaceutically acceptable salt or hydrate thereof as active ingredient.

7. A method of treatment of bacterial infections, said method comprising a step of administering at least one lipophosphonoxin of the general formula I as claimed in claim 1, or diastereomer or a pharmaceutically acceptable salt or hydrate thereof to a subject in need of such treatment.

* * * * *